United States Patent [19]
Tsuru et al.

[11] Patent Number: 6,027,145
[45] Date of Patent: Feb. 22, 2000

[54] JOINT FOR STEEL PIPE HAVING HIGH GALLING RESISTANCE AND SURFACE TREATMENT METHOD THEREOF

[75] Inventors: Eiji Tsuru; Masaharu Oka; Haruyuki Nagayoshi; Akira Nakashima; Seijun Higuchi; Ryusuke Inoue, all of Kitakyushu; Toshio Akiyama, Tochigi; Kazumi Sagara, Ibaraki, all of Japan

[73] Assignee: Nippon Steel Corporation, Tokyo, Japan

[21] Appl. No.: 08/809,344

[22] PCT Filed: Oct. 4, 1995

[86] PCT No.: PCT/JP95/02034

§ 371 Date: May 23, 1997

§ 102(e) Date: May 23, 1997

[87] PCT Pub. No.: WO96/10710

PCT Pub. Date: Apr. 11, 1996

[30] Foreign Application Priority Data

| Oct. 4, 1994 | [JP] | Japan | 6-239850 |
| Oct. 4, 1994 | [JP] | Japan | 6-239851 |
| Mar. 2, 1995 | [JP] | Japan | 7-043245 |
| Mar. 2, 1995 | [JP] | Japan | 7-043246 |

[51] Int. Cl.[7] ........................ F16L 7/00
[52] U.S. Cl. ............... 285/94; 285/333; 29/458; 508/150; 508/167; 427/190; 427/372.2
[58] Field of Search ................ 285/94, 333, 334, 285/355, 390, 55; 508/150, 167; 427/190, 205, 372.2; 29/458

[56] References Cited

U.S. PATENT DOCUMENTS

| 3,294,682 | 12/1966 | MacKinnon et al. | 285/94 X |
| 3,355,192 | 11/1967 | Kloesel et al. | 285/94 |
| 3,573,111 | 3/1971 | Thurston . | |
| 3,653,675 | 4/1972 | Schaefer | 285/94 X |
| 4,414,247 | 11/1983 | Hubecker et al. . | |

(List continued on next page.)

FOREIGN PATENT DOCUMENTS

| 520538 | 2/1982 | Australia . |
| 0157392 | 10/1985 | European Pat. Off. . |
| 1001468 | 11/1989 | France . |
| 58-17285 | 2/1983 | Japan . |
| 58-31097 | 2/1983 | Japan . |
| 59-44552 | 10/1984 | Japan . |

(List continued on next page.)

OTHER PUBLICATIONS

Von Lapple W.: "Schmierwirksame Oberflachenschichten–eine neue Technologien", Metalloberflache, vol. 34, No. 8, Aug. 1, 1980, Munchen DE, pp. 328–330 XP002059857, p. 329, right–hand column, paragraph 2.

Patent Abstracts of Japan, vol. 009, No. 082 (C–275), Apr. 11, 1985 & JP 59 215395 A (Nihon Funmatsu Coukin KK), Dec. 5, 1984.

(List continued on next page.)

*Primary Examiner*—Dave W. Arola
*Attorney, Agent, or Firm*—Kenyon & Kenyon

[57] ABSTRACT

An object of the present invention is to provide galling resistance to a threaded joint used for an oil well pipe. On a thread portion and a metallic sealing portion of the joint, there is provided a manganese phosphate chemical formation coating layer, or alternatively there are provided a nitriding layer of 1 to 20 μm thickness and a manganese phosphate chemical formation coating layer of 5 to 30 μm thickness, and also there is coated a solid lubricant which contains powder of molybdenum disulfide or tungsten disulfide and also contains one of epoxy resin, furan resin or polyamide resin as an essential component, and a ratio of composition is maintained at a specific value, so that a solid lubricant coating layer of 10 to 45 μm thickness can be formed by heating.

Due to the above surface treatment, even when the frequency of repetition of fastening and unfastening of the joint is increased, the occurrence of galling can be prevented over a long period of time.

16 Claims, 12 Drawing Sheets

U.S. PATENT DOCUMENTS

| | | | |
|---|---|---|---|
| 4,630,849 | 12/1986 | Fukui et al. | 285/94 X |
| 4,692,988 | 9/1987 | Shulver et al. | |
| 4,758,025 | 7/1988 | Frick | 285/94 X |
| 4,871,194 | 10/1989 | Kawashima et al. | 285/94 X |
| 5,069,761 | 12/1991 | Krings et al. | |

FOREIGN PATENT DOCUMENTS

| | | |
|---|---|---|
| 60-26695 | 2/1985 | Japan . |
| 61-124792 | 6/1986 | Japan . |
| 61-136087 | 6/1986 | Japan . |
| 62-209291 | 9/1987 | Japan . |
| 62-258283 | 11/1987 | Japan . |
| 63-210487 | 9/1988 | Japan . |
| 4-277392 | 10/1992 | Japan . |
| 5-117870 | 5/1993 | Japan . |
| 5-41876 | 6/1993 | Japan . |
| 6-10154 | 1/1994 | Japan . |
| 6-11078 | 1/1994 | Japan . |
| 6-713 | 1/1994 | Japan . |

OTHER PUBLICATIONS

Patent Abstracts of Japan, vol. 017, No. 265 (C–1062), May 25, 1993 & JP 05 005230 A (Hiroyuki Kanai), Jan. 14, 1993.

Patent Abstracts of Japan, vol. 007, No. 055 (M–198), Mar. 5, 1983 & JP 57 200726 A (Ishikawajima Harima Jukogyo KK), Dec. 9, 1982.

JOINT FOR STEEL PIPE HAVING HIGH GALLING RESISTANCE AND SURFACE TREATMENT METHOD THEREOF

TECHNICAL FIELD

The present invention relates to a threaded joint, the galling resistance of which is high even when it is used under the condition of no lubricant. More particularly, the present invention relates to a threaded joint used for joining oil well steel pipes when crude oil is mined, and also used for joining steel pipes in a pipeline to transport crude oil after it has been mined, and the galling resistance of the threaded joint is high even when it is used under the condition of no lubricant, that is, under the condition in which no lubricant is coated on the threaded joint which is repeatedly fastened and unfastened. The present invention also relates to a method of surface treatment of the threaded joint of steel pipes.

BACKGROUND ART

In general, threaded joints are used for the tubing and casing when an oil well is drilled. When these threaded joints are used in an actual environment, they are given a compound force including an internal and external pressure, an axial force and a bending force. Accordingly, these threaded joints are required not to leak or be damaged even when the compound force is given to them. On the other hand, when the tubing and casing are set in an oil well, threaded joints to join the oil well pipes are unfastened after they have been once fastened. In general, according to API (American Petroleum Institute), it is desired that no galling occurs in the threaded joints even when the tubing is fastened and unfastened 10 times and the casing is fastened and unfastened 3 times. In order to meet the above requirements, it is common at present that the threaded joints are fastened after compound grease stipulated in API BUL5A2 has been coated on the joints. In this case, compound grease works to ensure the galling resistance and enhancing the sealing property of the threaded joints.

In order to further enhance the sealing property of the threaded joints, special threaded joints having a contact portion in which metal comes into contact with metal, that is, premium joints have been actively developed. As disclosed in Japanese Examined Patent Publication Nos. 59-44552 and 5-41876, premium joints having sealing sections of various shapes have been invented. According to the above inventions, gas-sealing properties of the above joints are enhanced to the same level as that of the yield strength of the steel pipe. However, in order to further enhance the sealing property, a surface pressure higher than the yield strength of the mother metal must be given to the metal contact portion of the threaded joint. Accordingly, galling incapable of being repaired tends to occur in the threaded joint.

Therefore, the inventors actively investigated the prevention of galling.

There are provided various measures to prevent the occurrence of galling, which will be described as follows. Compound grease is made to appropriately contain powder of a heavy metal such as zinc, lead or copper; alternatively compound grease is made to appropriately contain powder of an inorganic compound such as mica; a shape of the sealing section is devised so that the local surface pressure on the threaded joint can be reduced as disclosed in Japanese Unexamined Patent Publication Nos. 62-209291 and 4-277392; a characteristic of the sealing surface is controlled as disclosed in Japanese Examined Utility Model Publication No. 6-713; and galling resistance is enhanced by conducting surface treatment on the threaded joint as disclosed in Japanese Examined Patent Publication No. 3-78517 and Japanese Unexamined Patent Publication Nos. 5-117870, 62-258283, 60-26695, 58-31097, 58-17285, 61-124792 and 61-136087. The aforementioned techniques are respectively effective to prevent the occurrence of galling. Especially when an appropriate surface treatment is conducted on the threaded joint and an appropriate compound grease is used to coat the threaded joint, galling resistance can be enhanced to a sufficiently high level to be put into practical use.

According to Japanese Examined Patent Publication No. 3-78517, threaded joints used for steel pipes to drill an oil well are coated with the coating of resin in which powder of molybdenum disulfide is dispersed and mixed. However, according to the technique disclosed in the above patent publication, the resin coating layer is formed in a range within the surface roughness of a portion in which metal comes into contact with metal. In the above technique, consideration is given to the coating of compound grease, that is, the target of the above technique is to enclose compound grease in the small spaces formed by irregularities on the surface of the threaded joint. Accordingly, when the threaded joint is fastened under the condition of no lubricant, metal is selectively contacted with metal. Therefore, it is impossible to stably provide a galling resistance. Further, in the above technique, consideration is not given to a surface preparation for preventing the deterioration with time, but consideration is given only to the surface roughness. Therefore, it is impossible to provide a stable galling resistance by the above technique over a long period of time.

Further, Japanese Unexamined Patent Publication No. 6-10154 discloses a technique in which a relation between the maximum surface roughness before surface treatment and the thickness of surface coating is stipulated. However, an object of the above technique is to enhance the sealing property by reducing a clearance formed between metal and metal in the metal contact portion. In the above patent publication, the effect of compound grease is described, however, no description is made about the galling resistance under the condition of no lubricant. As described above, by the metallic surface treatment described in the example, it is impossible to provide a galling resistance under the condition of no lubricant.

In the above circumstances, investigation has been recently made into grease to be coated on threaded joints. According to Japanese Unexamined Patent Publication Nos. 63-210487 and 6-11078, it is disclosed that the performance of grease is deteriorated when high pressure is given to grease coated on a threaded joint in the process of making up the threaded joint, that is, in the process of fastening the threaded joint. Further, environmental problems are discussed which are caused by heavy metal contained in compound grease. Therefore, it is attempted to develop compound grease containing no heavy metal and put it on the market. According to API RP5C5 which was enacted in 1991, it is stipulated to evaluate effects provided by a quantity of grease and a pressure given to grease. To make the matter worse, when compound grease is coated at the site, the working environment is deteriorated, and at the same time the working efficiency is lowered. In view of the above circumstances, it is required to provide an epoch-making threaded joint by which galling resistance can be ensured without using any compound grease. In spite of the above circumstances, it is inevitable to use compound grease when a threaded joint is joined. The reason is that the galling resistance is greatly deteriorated when the threaded joint is joined under the condition of no lubricant.

According to U.S. Pat. No. 4,692,988, it is described to use molybdenum disulfide as a solid lubricant to be coated on a threaded joint and then the threaded joint is bound by PTFE, and also a method of coating PTFE by carrier is described. It is recognized that the above technique can provide effects when it is used in a threaded joint together with liquid lubricant. When the above technique is used under the condition of no lubricant, which is the final object of the present invention, it impossible for the above technique to provide a sufficient effect. The reason is described below. Especially when a threaded joint is sealed, sliding motions are repeatedly conducted in the threaded joint while a surface pressure higher than the yield strength of the pipe body is given onto the threaded joint. Therefore, galling occurs in the thread portion of the joint.

In order to solve the above problems, the present inventors made investigation into the surface preparation and finally found a means for providing the galling resistance under the condition of no lubricant. The means is described as follows. After the sealing portion and the thread portion of a threaded joint have been subjected to an appropriate treatment of phosphate coating, a solid lubricant coating is provided on the phosphate coating.

U.S. Pat. No. 4,414,247 discloses an example in which solid lubricant is applied to a threaded joint in the same manner as described above. According to the above invention, after a threaded joint has been subjected to the surface preparation of blasting, molybdenum disulfide is coated and baked on the joint together with resin. However, when the surface preparation of blasting is conducted on the joint, it is impossible to provide a sufficiently high galling resistance under the condition of no lubricant. On the other hand, when the joint is subjected to the treatment of phosphate coating, no galling occurs even under the condition of no lubricant as described in the example, and it is possible to make up and break out the joint more than 10 times.

The reason why the galling resistance can be enhanced by the phosphate coating layer is described as follows. Irregularities and voids formed on the phosphate coating layer enhance the anchor effect of resin. Therefore, even after sliding has been repeatedly conducted, a thin lubricant coating remains on an upper surface of the phosphate coating layer.

CONSTRUCTION OF THE INVENTION

In order to solve the above problems, the present inventors have made investigations in earnest. An object of the present invention is to provide a joint of steel pipe having a high galling resistance and also to provide a surface treatment method thereof. According to the present invention, it is possible to provide a joint of steel pipe having a high galling resistance without using liquid lubricant such as compound grease which is conventionally coated on the joint before the process of making up. Therefore, no galling occurs even after the joint has been repeatedly fastened and unfastened, and the sealing performance can be maintained high. The summary of the present invention is described as follows.

(1) The present invention is to provide a threaded joint having high galling resistance comprising: a pin composed of an external thread and a metal contact portion having no thread; and a box composed of an internal thread and a metal contact portion having no thread, wherein a phosphate chemical formation coating layer of 5 to 30 $\mu$m thickness, or a nitriding layer of 1 to 20 $\mu$m thickness and a phosphate chemical formation coating layer of 5 to 30 $\mu$m thickness are provided on a contact surface of the box or the pin, and a resin coating layer of 10 to 45 $\mu$m thickness on which powder of molybdenum disulfide or tungsten disulfide is dispersed is formed on the phosphate chemical formation coating layer.

(2) The present invention is to provide a threaded joint having high galling resistance according to item (1), wherein the thickness of the resin coating is larger than the surface roughness of the phosphate chemical formation coating layer.

(3) The present invention is to provide a threaded joint having high galling resistance according to item (1) or (2), wherein the surface roughness of sliding surfaces opposed to each other is smaller than the thickness of the resin coating layer.

(4) The present invention is to provide a threaded joint having high galling resistance according to one of items (1) to (3), wherein the thickness of the phosphate chemical formation coating layer is 5 to 30 $\mu$m, the thickness of the nitriding processing layer is 1 to 20 $\mu$m, a quantity of powder of molybdenum disulfide or tungsten disulfide is determined by the following expression, 0.2≦{quantity of powder of (molybdenum disulfide or tungsten disulfide)}/{quantity of (resin)}≦9.0, and the thickness of the resin coating layer is 10 to 45 $\mu$m.

(5) The present invention is to provide a threaded joint having high galling resistance according to one of items (1) to (4), wherein a corrosion inhibitor is dispersed and mixed in the resin.

(6) The present invention is to provide a method of conducting surface treatment on a joint of steel pipe comprising the steps of: providing a manganese phosphate chemical formation coating layer of 5 to 30 $\mu$m thickness on a thread portion and a metallic sealing portion of the joint of steel pipe, or providing a nitriding layer of 1 to 20 $\mu$m thickness and a manganese phosphate chemical formation coating layer of 5 to 30 $\mu$m thickness; and coating a solid lubricant containing powder of molybdenum disulfide or tungsten disulfide and also containing one of epoxy resin, furan resin and polyamideimide resin, the composition of which satisfies the following expression, 0.2≦{quantity of (powder of molybdenum disulfide or tungsten disulfide)}/{quantity of (one of epoxy resin, furan resin and polyamideimide resin)}≦9.0 (weight ratio);

and conducting heat treatment on the thus provided layer so as to form a solid lubricating coating layer of 10 to 45 $\mu$m thickness.

(7) The present invention is to provide a method of conducting surface treatment on a joint of steel pipe according to item (6), further comprising the step of coating a solid lubricant containing powder of one of Cu and Zn or powder of both Cu and Zn, the quantity of which is 10 to 50 weight % with respect to a quantity of powder of molybdenum disulfide or tungsten disulfide, wherein the composition satisfies the following expression, 0.2≦{quantity of (powder of molybdenum disulfide or tungsten disulfide) and quantity of (powder of one of Cu and Zn or powder of both Cu and Zn)}/{quantity of (one of epoxy resin, furan resin and polyamideimide resin)}≦9.0 (weight ratio).

(8) The present invention is to provide a method of conducting surface treatment on a joint of steel pipe according to item (6), wherein a particle diameter of powder of molybdenum disulfide or tungsten disulfide, which is an essential component of solid lubricant to compose a solid lubricant coating layer, is in a range from 0.45 to 10 μm when it is measured by Fisher's Measuring Method, and the solid lubricant is composed of one of epoxy resin of which the molecular weight is in a range from 2000 to 10000, furan resin of which the molecular weight is in a range from 150 to 250, and polyamideimide resin of which the molecular weight is in a range from 10000 to 25000.

(9) The present invention is to provide a method of conducting surface treatment on a joint of steel pipe according to item (7), comprising the step of coating a solid lubricant containing powder of one of Cu and Zn or powder of both Cu and Zn, wherein a particle diameter of powder of Cu and Zn is in a range from 0.5 to 10 μm.

(10) The present invention is to provide a method of conducting surface treatment on a joint of steel pipe for providing a three layer type coating layer comprising the steps of: providing a nitriding layer, the thickness of which is 1 to 20 μm, on a thread portion or a metal seal portion of the joint of an oil well steel pipe made of alloy steel, the Cr content of which is not less than 10 weight %; providing a surface treatment layer of an iron plating layer, the thickness of which is 0.5 to 15 μm, or an iron alloy plating layer containing one of Ni and Co or both Ni and Cr, the weight % of which is not more than 10% and also providing a manganese phosphate chemical formation coating layer, the thickness of which is 5 to 30 μm; and coating a solid lubricant containing powder of molybdenum disulfide or tungsten disulfide and also containing one of epoxy resin, furan resin and polyamideimide resin, the composition of which satisfies the following expression, 0.2≦{quantity of (powder of molybdenum disulfide or tungsten disulfide)}/{quantity of (one of epoxy resin, furan resin and polyamideimide resin)}≦9.0 (weight ratio);

and conducting heat treatment to form a solid lubricant coating layer of 10 to 45 μm thickness.

(11) The present invention is to provide a method of conducting surface treatment on a joint of steel pipe according to item (10), further comprising the step of coating a solid lubricant containing powder of one of Cu and Zn or powder of both Cu and Zn, the quantity of which is 10 to 50 weight % with respect to a quantity of powder of molybdenum disulfide or tungsten disulfide.

(12) The present invention is to provide a method of conducting surface treatment on a joint of steel pipe according to item (10), wherein a particle diameter of powder of molybdenum disulfide or tungsten disulfide, which is an essential component of solid lubricant to compose a solid lubricant coating layer, is in a range from 0.45 to 10 μm when it is measured by Fisher's Measuring Method, and the solid lubricant is composed of one of epoxy resin of which the molecular weight is in a range from 2000 to 10000, furan resin of which the molecular weight is in a range from 150 to 250, and polyamideimide resin of which the molecular weight is in a range from 10000 to 25000.

(13) The present invention is to provide a method of conducting surface treatment on a joint of steel pipe according to item (11), wherein a particle diameter of powder of molybdenum disulfide or tungsten disulfide, which is an essential component of solid lubricant to compose a solid lubricant coating layer, is in a range from 0.45 to 10 μm when it is measured by Fisher's Measuring Method, a particle diameter of powder of one of Cu and Zn or a particle diameter of powder of both Cu and Zn is in a range from 0.5 to 10 μm, and the solid lubricant is composed of one of epoxy resin of which the molecular weight is in a range from 2000 to 10000, furan resin of which the molecular weight is in a range from 150 to 250, and polyamideimide resin of which the molecular weight is in a range from 10000 to 25000.

BEST MODE FOR CARRYING OUT THE INVENTION

Figure 1:
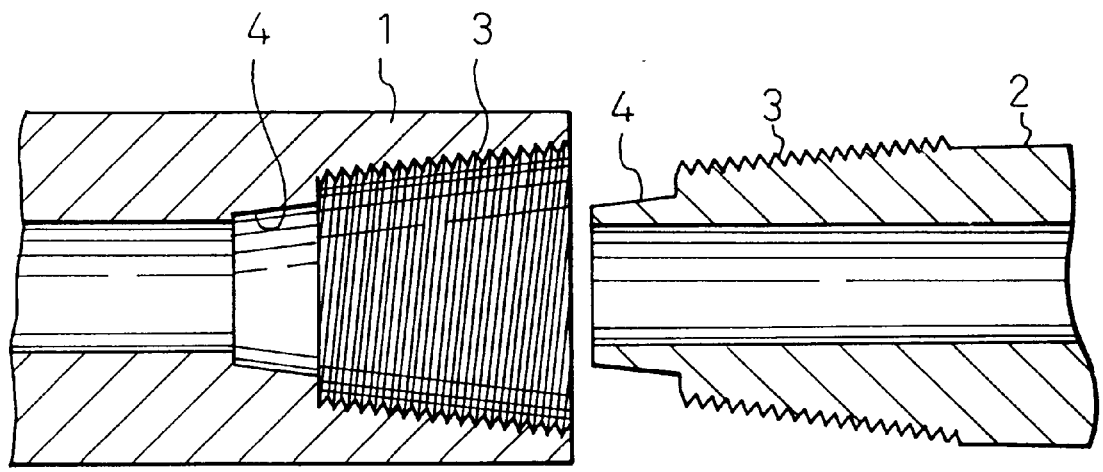
FIG. 1 is a schematic illustration of the components of a joint to which the present invention is applied.

FIG. 1 is a schematic illustration of the components of a joint to which the present invention is applied. As illustrated in FIG. 1, the joint includes a box 1 and a pin 2 which is a joint portion arranged at an end of a steel pipe. In each joint member, there are provided a screw portion 3 and a metal-metal contact portion 4. With respect to the screw portion 3 and the metal-metal contact portion 4 composing the joint, only on the box 1 or on the contact boundary surface of both the box 1 and the pin 2, there are provided a manganese phosphate chemical formation coating layer and a resin coating layer. Alternatively, there are provided a surface preparation nitriding layer, a manganese phosphate chemical formation coating layer and a resin coating layer. When the joint is screwed, the aforementioned surface treatment layer slides on the surface of mother metal.

Figure 2:
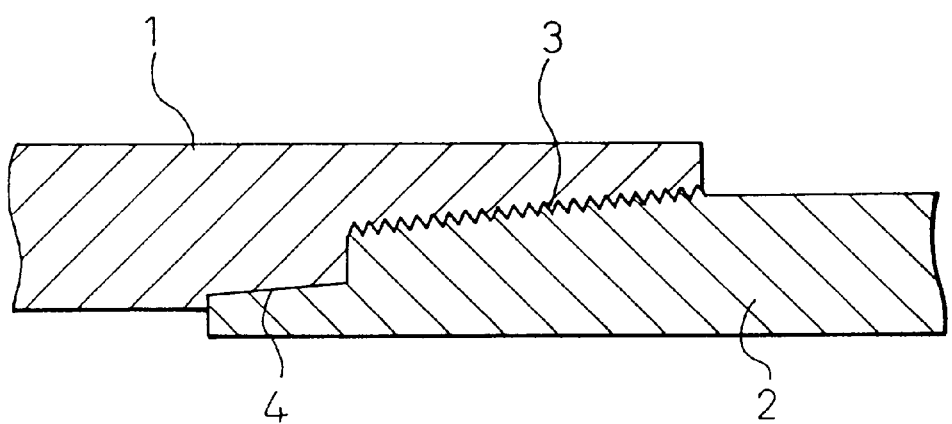
FIG. 2 is a view showing an assembling structure of the components of a joint.

FIG. 2 is a view showing an assembling structure of the components of the joint. As illustrated in FIG. 2, the box 1 and the pin 2 are engaged with each other, and the respective screw portions 3 and the respective metal-metal contact portions slide on each other while high surface pressure is given to them. In general, when a joint diameter is increased, a severe galling resistance is required of a joint. Therefore, an evaluation test to evaluate the galling resistance was conducted on a premium joint having a metal-metal contact portion, the diameter of which was 178 mmφ, which was the maximum tubing size in which no galling was caused even after fastening and unfastening were repeatedly conducted, for example, 10 times.

Figure 3:
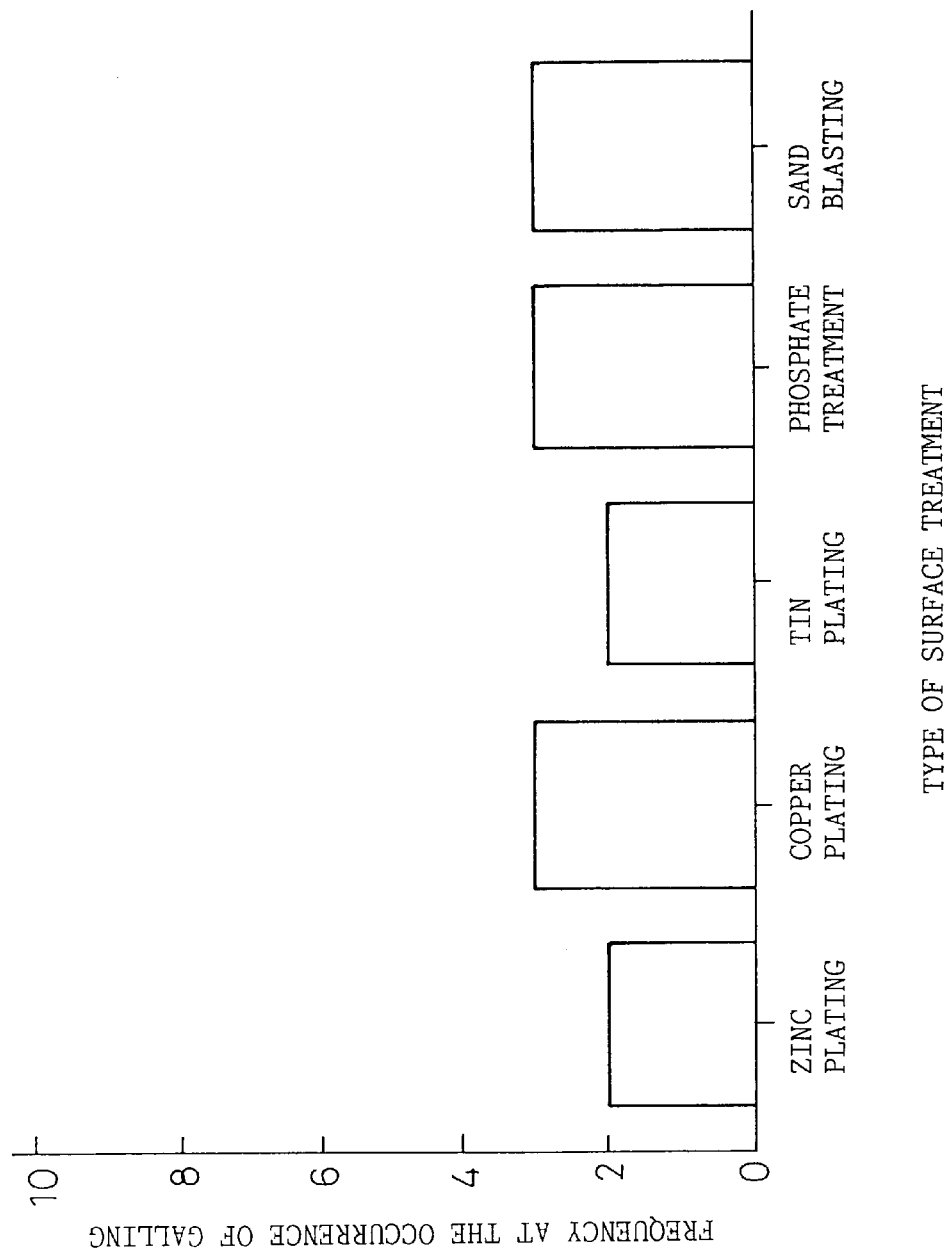
FIG. 3 is a graph showing a relation between the types of various surface treatment and the frequency of occurrence of galling.

FIG. 3 is a graph showing a relation between various methods of surface treatment and the frequency of occurrence of galling. FIG. 3 shows the frequency of occurrence of galling in the cases where various boxes were used which had been subjected to zinc plating, copper plating, tin plating, phosphate treatment and sand blasting. In the above cases, pins were used as they had been machined and no lubricant was coated on the pins. When the boxes and the pins were repeatedly fastened and unfastened, galling occurred. FIG. 3 shows the frequency of occurrence of galling. Even in the case of copper plating, the galling resistance of which is considered to be highest, galling occurred when the box and the pin were fastened and unfastened only three times. In view of the result of the above test, it can be understood that it is very difficult to ensure the galling resistance under the condition of no lubricant. The reason is described as follows. Commonly, in the case of a premium joint, in order to conduct gas sealing, the metal-metal contact portion of the premium joint is given a high surface pressure of 600 MPa which exceeds the yield point of mother metal. While the joint is made up and broken out, a metallic surface slides on another metallic surface under the condition of high surface pressure.

In order to solve the above problems, the inventors took notice of molybdenum disulfide and tungsten disulfide, the lubricating properties of which are high under a high surface pressure. They made investigation into a coating of solid lubrication used for the threaded joint of an oil well pipe.

In general, it is well known that the effect of solid lubricant depends upon a condition in which the solid lubricant is used. That is, the effect of a lubricant greatly depends upon surface pressure, sliding speed, type of the solid lubricant, surface condition and temperature. When molybdenum disulfide or tungsten disulfide is used as solid lubricant, it exhibits a high galling resistance when it is used in an appropriate condition, or alternatively its lubrication effect is inferior to that of common grease when it is not used in an appropriate condition. In the case where molybdenum disulfide or tungsten disulfide is used as solid lubricant, it is no exaggeration to say that the lubricating property depends upon the surface preparation and the binder.

Figure 4:
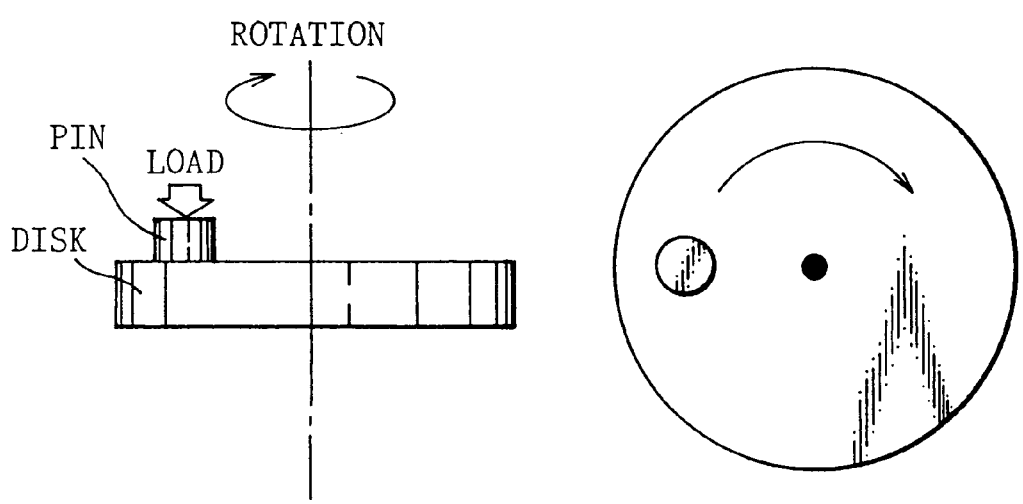
FIG. 4 is a schematic illustration showing an outline of the test conducted in the present invention.

For the reasons described above, when the galling resistance of a joint is evaluated, it is most preferable to use an actual joint. However, from the viewpoint of making a relative comparison of the lubricating property of coating, the present inventors developed a pin-on-disk type galling evaluation tester, and evaluation was conducted using small samples. The reason why a conventional galling evaluation tester such as Bouden Friction Tester was not used in this test is that the effect of enhancing the galling resistance of coating greatly depends upon an environment in which it is used. In the case of a premium joint, since the contact surface pressure is very high as described before, even when the test is carried out on a small scale, it is necessary to give a high surface pressure. FIG. 4 is a schematic illustration showing an outline of the test conducted in the present invention. Samples and experimental conditions are shown as follows.

| | |
|---|---|
| Pin | Shape of the surface to be tested: R24 mm |
| Disk | Outer diameter: 250 mmφ |
| | Surface roughness: 0.007 mm |
| Test condition | Load: 230 kg |
| | Sliding speed: 5 m/min |
| | Rotational diameter: 178 mm |
| | Temperature: 20° C. |
| | Lubricant: not used |

In the test, pins were coated with coating, the galling resistance of which was high. Pins and disks were assumed to be those of the actual joints. Therefore, they were machined by a lathe so that the surface roughness could be the same as that of the actual joint. A sliding distance per one revolution corresponded to a pipe, the outer diameter of which was 178 mm. At the maximum sliding speed allowed in the actual joint, the same high surface pressure as that of the actual joint was given. This test was characterized in that the galling resistance was evaluated without using any lubricant such as grease.

Figure 5:
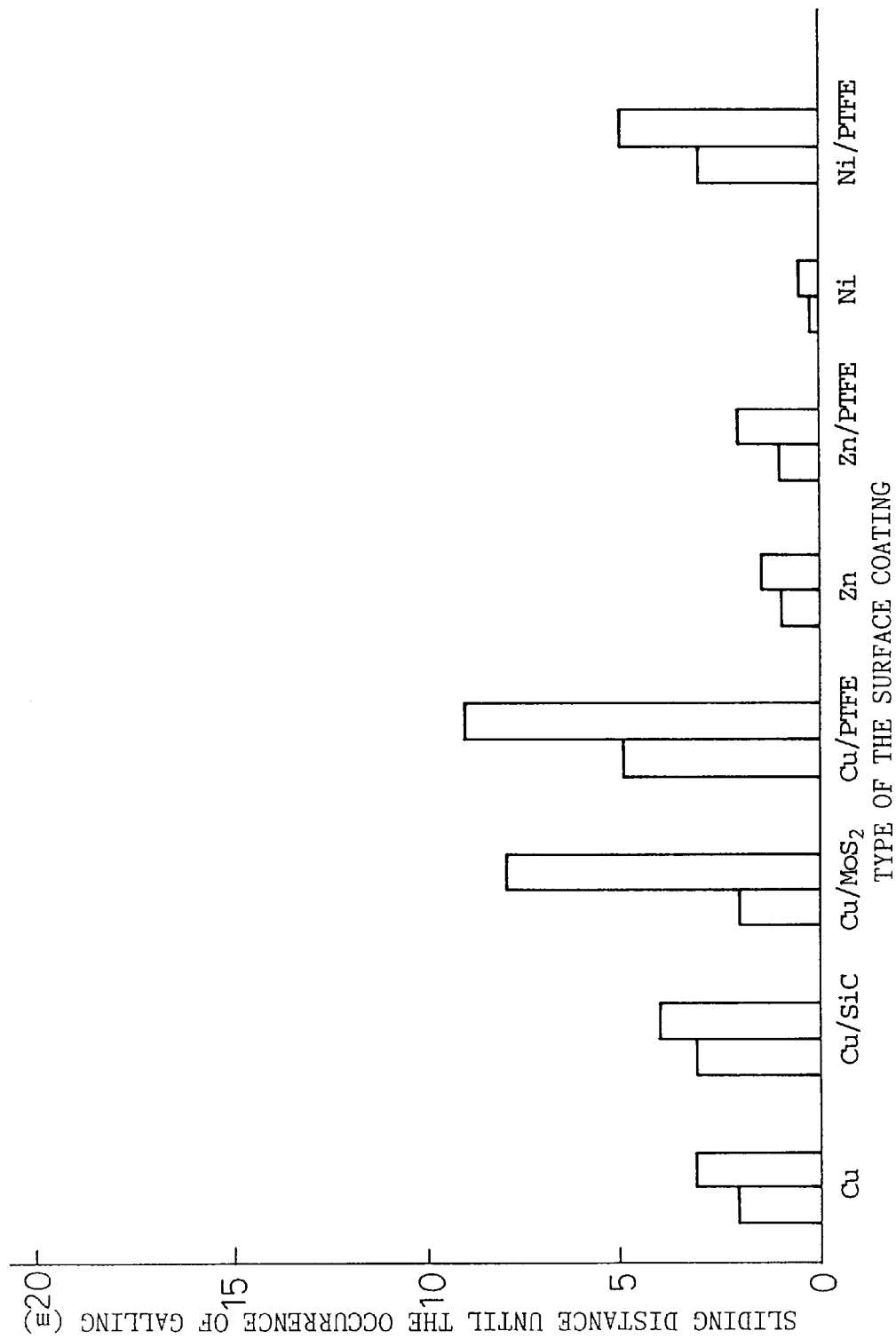
FIG. 5 is a graph showing a relation between the type of surface coating formed by dispersion plating and the sliding distance at which galling has occurred.

First, the present inventors evaluated the dispersion plating in which the matrix was formed by an existing metallic plating layer and molybdenum disulfide was dispersed and mixed. The result of evaluation is shown in FIG. 5. That is, FIG. 5 is a graph showing a relation between the type of surface coating formed by means of dispersion plating, and the sliding distance at which galling occurred. As shown on the graph of FIG. 5, the galling resistance of dispersion plating greatly depends upon the galling resistance of the matrix, and no effects were provided by the dispersed molybdenum disulfide. It can be understood that the galling resistance of the single body of the metallic matrix was higher than the galling resistance of the dispersion plating in which molybdenum disulfide was used. The above phenomenon is peculiar to a case in which high surface pressure is given. Under the condition of a light load, as it is commonly said, molybdenum disulfide can provide a high lubricating effect, so that the dispersion plating can provide a higher galling resistance than the single body of the metallic matrix. The circumstances are the same when tungsten disulfide is used.

Figure 6:
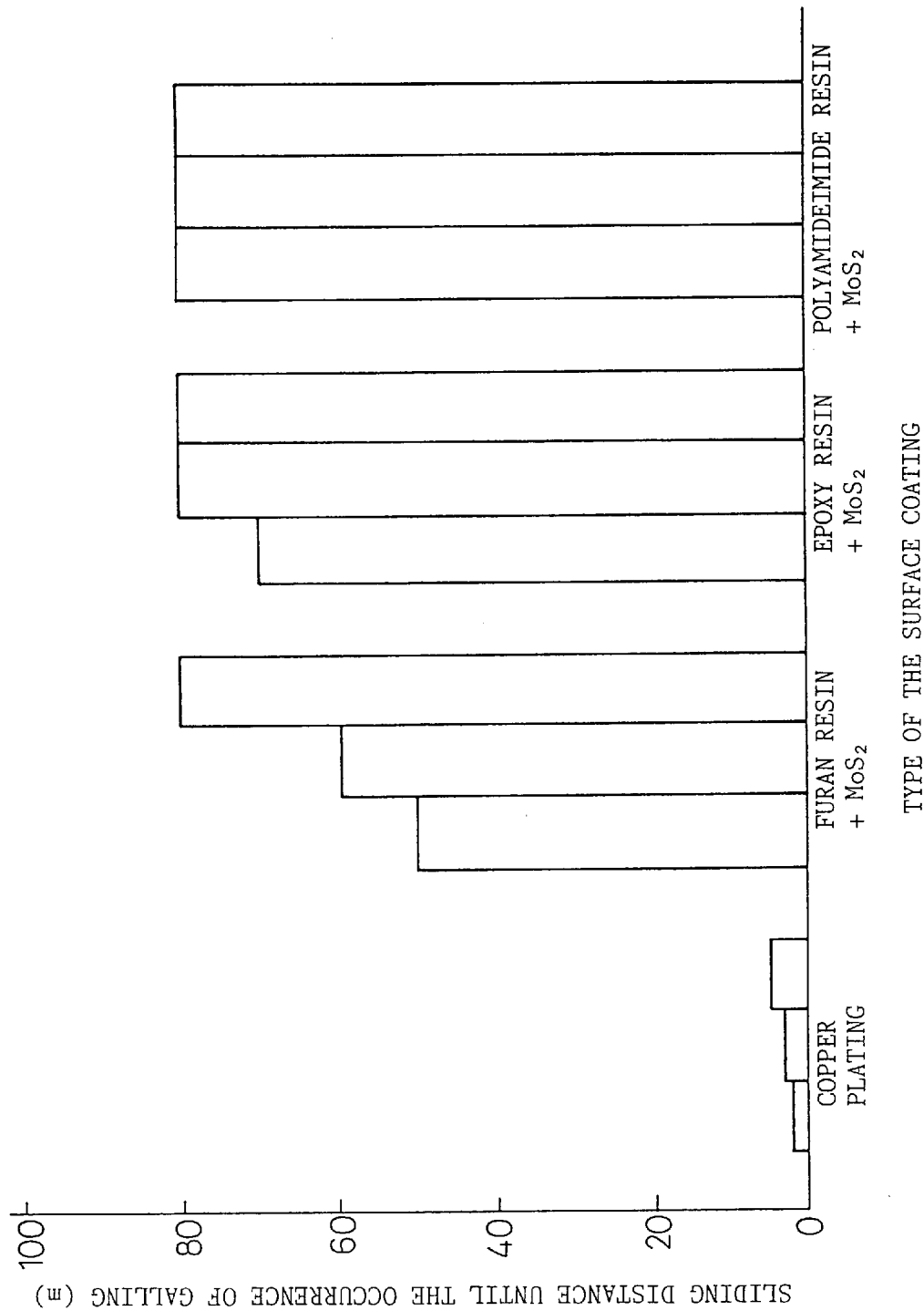
FIG. 6 is a graph showing a relation between the type of coating on which powder of molybdenum disulfide is dispersed and mixed in various resins and the sliding distance at which galling has occurred.

Next, FIG. 6 shows the result of evaluation of coating on which powder of molybdenum disulfide was dispersed and mixed in a binder made of resin such as polyamideimide, epoxy or furan. FIG. 6 is a graph showing a relation between the type of coating, on which powder of molybdenum disulfide was dispersed and mixed in various resins, and the sliding distance at which galling occurred. In the above case, as a surface preparation, manganese phosphate chemical formation treatment was conducted. The galling resistance of the above coating was 10 times as higher as that of copper plating which was conventionally considered to be the best. Even when the sliding distance reached the maximum testing sliding distance 80 m which was temporarily set, no galling occurred. Tungsten disulfide can provide the same effect as that described above.

Galling resistance depends upon the type of a binder to be used in the coating. The highest galling resistance was provided by polyamideimide. The order of binder to provide high galling resistance was polyamideimide, epoxy and furan. Galling resistance is concerned with the tensile strength and impact value of the resin itself.

A quantity of the above organic resin must be determined by the following expression, 0.2≦{quantity of powder of (molybdenum disulfide or tungsten disulfide)}/{quantity of (resin)}≦9.0, and the thickness of the resin coating layer must be 10 to 45 $\mu$m and the resin coating layer must be formed on a phosphate chemical formation coating layer which is a surface preparation layer. When a ratio of the quantity of powder of molybdenum disulfide or tungsten disulfide to the quantity of organic resin binder is lower than 0.2, it is difficult to enhance the lubricating performance of a solid lubricating coating layer to be formed. When the ratio exceeds 9, the adhesion property of the formed solid lubricating coating layer is deteriorated, and especially powder of molybdenum disulfide or tungsten disulfide is peeled off from the coating layer. Therefore, the ratio exceeding 9 is not preferable. Accordingly, the ratio of a quantity of molybdenum disulfide or tungsten disulfide, which is an essential component to form a solid lubricating coating layer, to a quantity of organic resin is determined to be in a range from 0.2 to 9.

The resin coating layer is formed by the thickness of 10 to 45 $\mu$m on the phosphate chemical formation coating layer subjected to surface preparation. When the coating thickness is smaller than 10 $\mu$m, it is impossible to enhance the lubricating performance sufficiently, and further the frequency of making up and breaking out of a joint of steel pipe is reduced. Therefore, a coating thickness smaller than 10 $\mu$m is not preferable.

On the other hand, when the coating thickness exceeds 45 $\mu$m, enhancement of the lubricating performance is saturated, and further the making-up torque is increased too much. Therefore, it is disadvantageous to adopt the coating thickness exceeding 45 $\mu$m. When the coating thickness exceeds 45 $\mu$m, there is a tendency that the adhesion property of a solid lubricating coating layer is deteriorated. Accordingly, the coating layer is peeled off. For the above reasons, it is not preferable to adopt the coating thickness exceeding 45 $\mu$m. Accordingly, thickness of the resin coating layer was preferably determined to be in a range from 10 to 45 $\mu$m, and thickness of the resin coating layer was more preferably determined to be in a range from 15 to 40 $\mu$m.

Figure 7:
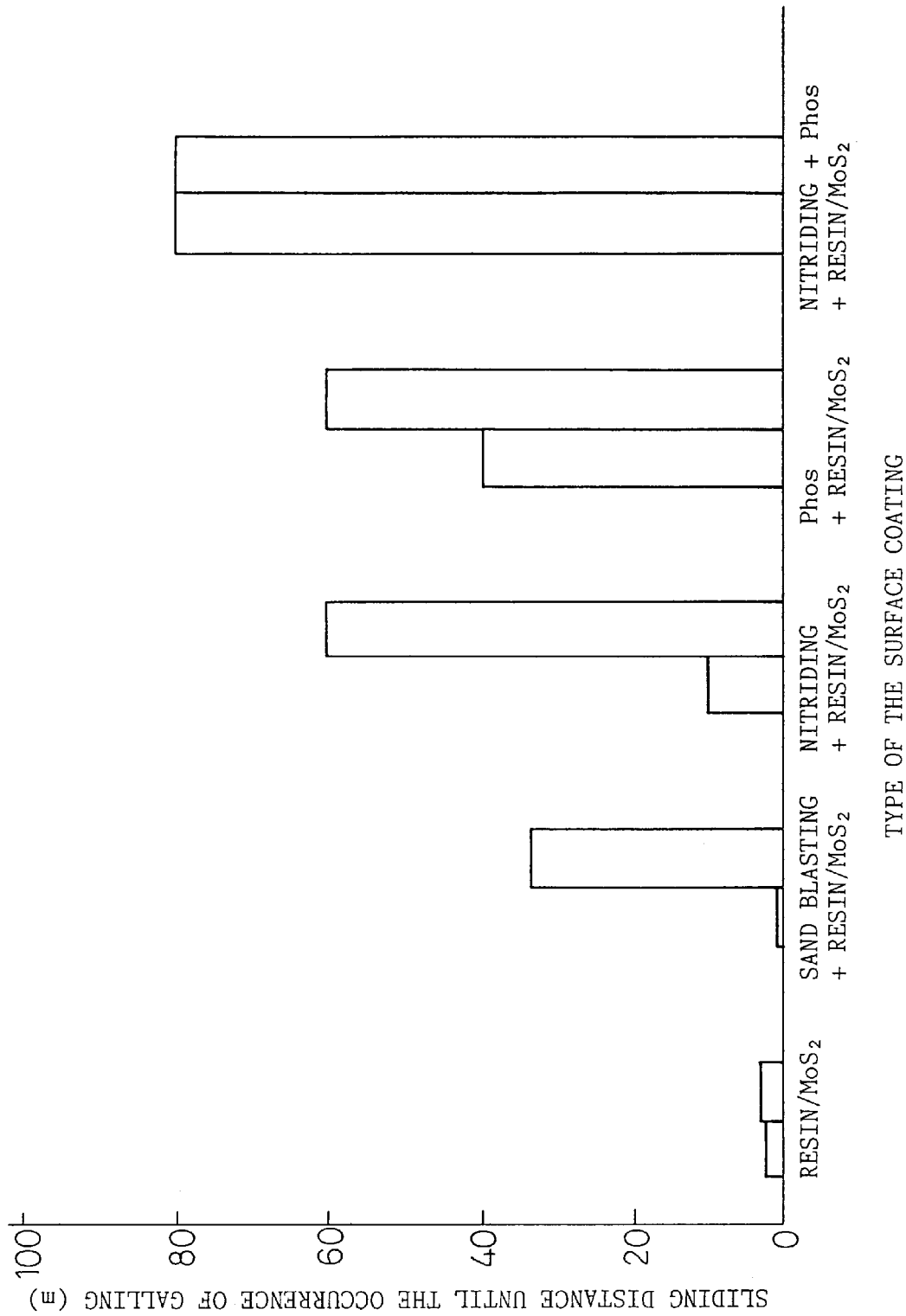
FIG. 7 is a graph showing a relation between the type of coating on which powder of molybdenum disulfide is dispersed and mixed in resin subjected to various substrate processing and the sliding distance at which galling has occurred.

Surface preparation is the most important factor to make the most of the characteristic of molybdenum disulfide. Therefore, the influence of the surface preparation on the galling resistance was evaluated, and the result of evaluation is shown in FIG. 7. FIG. 7 is a graph showing a relation between the type of coating, on which powder of molybdenum disulfide was dispersed and mixed in resin subjected to various substrate processing, and the sliding distance at which galling had occurred. Concerning the surface preparation, the evaluation test was conducted on manganese phosphate chemical formation, nitriding, sand blasting and no surface preparation. As a result of the evaluation, the order of excellence of galling resistance was manganese phosphate chemical formation, nitriding, sand blasting and no surface preparation. It was found that the galling resistance was the same as that of copper plating when no surface preparation was made. The circumstances were the same in the case of tungsten disulfide. When manganese phosphate treatment was conducted after the completion of nitriding, the most stable galling resistance could be provided. Further, it should be noted that the effect provided by molybdenum disulfide greatly fluctuated when sand blasting was used as a means of surface preparation. The reason is considered as follows. In a galling test in which no lubricant is used, protrusions on the surface formed by sand blasting are selectively contacted with the opponent metal, so that the resin coating is locally worn away. As a result, metal and metal are coagulated with each other, and galling tends to occur.

The present inventors took notice of the above mechanism and made investigation into the effect of coating thickness with respect to the manganese phosphate chemical formation. As a result of the investigation, it was found that it was most preferable to provide a phosphate chemical formation coating layer, the thickness of which was 5 to 30 $\mu$m. That is, when the thickness of a phosphate chemical formation coating layer is smaller than 5 $\mu$m, the phosphate chemical formation coating layer can not be uniformly formed. Therefore, the phosphate chemical formation coating layer can not be closely contacted with the solid lubricating coating layer. Especially when the joint is exposed to a corrosion environment over a long period of time, the coating layer can not be closely contacted. Further, after the solid lubricating coating layer has worn away, the lubricating performance can not be maintained to be high. That is, the galling resistance of a steel joint can not be sufficiently enhanced.

On the other hand, when a phosphate chemical formation coating layer, the thickness of which exceeds 30 $\mu$m, is generated, secondary crystals tend to be generated. Accordingly, the adhesion property of the coating itself is deteriorated, and further the adhesion property of the resin coating layer is also deteriorated. Therefore, the thickness exceeding 30 $\mu$m is not preferable. For the reasons described above, the thickness of the phosphate chemical formation coating layer is determined to be in a range from 5 to 30 $\mu$m in the present invention. It is preferable to restrict the thickness of the phosphate chemical formation coating layer to be in a range from 10 to 25 $\mu$m.

Further, in the present invention, a nitriding layer formed by dispersion processing is provided as a surface preparation layer of the manganese phosphate chemical formation coating layer. When the nitriding layer is provided, the following objects can be accomplished. The adhesion strength of the phosphate chemical formation coating layer can be enhanced, and especially the adhesion strength of the manganese phosphate chemical formation coating layer can be enhanced. The manganese phosphate chemical formation layer can be uniformly generated with respect to a joint of steel pipe, the composition of which inhibits uniform generation of this coating layer. Even after the resin coating has worn away, the lubricating effect can be kept over a long period of time.

However, in order to provide the above effects, the thickness of the surface preparation nitriding layer is restricted in a range from 1 $\mu$m to 20 $\mu$m. When the thickness of the surface preparation nitriding layer is smaller than 1 $\mu$m, defective portions are formed on the nitriding layer, so that it is impossible to provide the above effect. Therefore, the thickness of the surface preparation nitriding layer smaller than 1 μm is not preferable. On the other hand, when the thickness of the surface preparation nitriding layer exceeds 20 μm, the aforementioned effect is saturated. Since the hardness of the nitriding layer is high, the property of a joint of steel pipe is changed when the thickness of the nitriding layer is increased. Accordingly, the thickness of the surface preparation nitriding layer exceeding 20 μm is not preferable. According to the present invention, the thickness of the surface preparation nitriding layer is determined to be in a range from 1 to 20 μm, and it is preferable that the thickness of the surface preparation nitriding layer is determined to be in a range from 5 to 15 μm.

Figure 8:
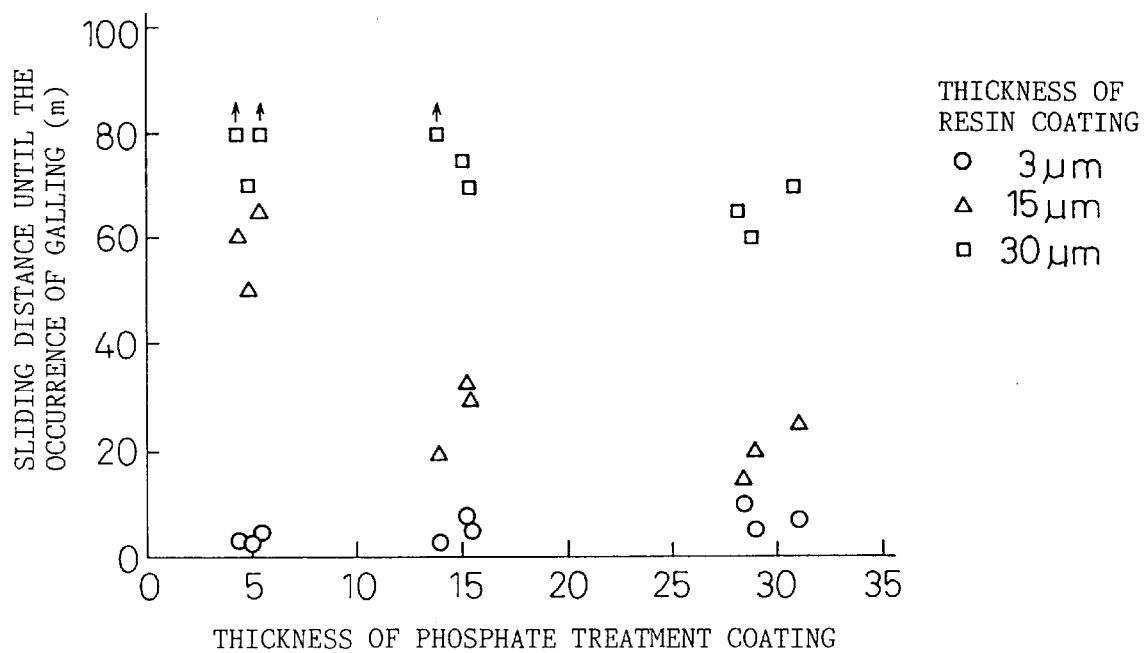
FIG. 8 is a graph showing a relation between the thickness of coating formed by phosphate chemical formation processing and the sliding distance at which galling has occurred.

FIG. 8 is a graph showing a relation between the thickness of coating formed by phosphate chemical formation and the sliding distance at which galling has occurred. As can be seen in the drawing, there is a specific relation between the thickness of a manganese phosphate chemical formation layer and the thickness of resin coating by which a higher galling resistance can be provided. The important thing is that the thickness of a resin coating is larger than the thickness of a chemical formation layer. The reason why the above combination is effective is described as follows. Even when the chemical formation, the mechanism of which is the same as that of the above surface preparation of sand blasting, is carried out, irregularities corresponding to the thickness of the chemical formation coating appear on the surface. Accordingly, in order to prevent the occurrence of selective contact, it is necessary to form a resin coating, the thickness of which is not less than the thickness of a chemical formation coating. When the phosphate chemical formation is not conducted and the surface roughness is reduced by sand blasting so that it can be lower than the thickness of resin coating, it is possible to obtain a considerably high effect. However, for the next reasons, it is preferable to conduct a phosphate chemical formation.

The reason why the surface preparation is specified to be a phosphate chemical formation coating layer is described below. Compared with the surface preparation conducted by sand blasting, the phosphate chemical formation is advantageous in that a change with time is seldom caused when the phosphate chemical formation is closely contacted with a resin layer, and further the workability of phosphate chemical formation is high. In order to make investigation into the change with time, the following test was carried out. Surface preparation was made on samples by means of manganese phosphate chemical formation and sand blasting. On those samples, resin coating layers were formed in the same manner, and the samples were dipped in water for one month. After that, the adhesion of the resin coating was observed. On the samples subjected to manganese phosphate chemical formation, there were no changes. However, on the samples subjected to sand blasting, the resin coating layers were separate from the sand blasted surface. Especially when the samples were stored in a wet environment, problems may be caused. From the viewpoint of workability, when sand blasting is used as a means of surface preparation, immediately after the completion of sand blasting, preferably within 30 minutes after the completion of sand blasting, it is necessary to conduct the coating treatment, however, on the manufacturing line, it is impossible to conduct the coating treatment within the above predetermined period of time. On the other hand, in the case of manganese phosphate chemical formation treatment, even after the samples were left for 2 weeks after the completion of treatment and resin coating was conducted on the samples, it was confirmed that no problems were caused from the viewpoint of practical use.

When grease is not used for lubrication, the gas sealing property in the metallic sealing portion is deteriorated. In order to evaluate the gas sealing property under the condition of no lubricant, the joint was repeatedly fastened and unfastened 10 times, and then the gas sealing property was evaluated in accordance with the load condition stipulated by API RP5C5. As a result of the evaluation test conducted in the same machining tolerance as that of a case of conventional grease lubrication, the joint leaked no gas. The reason why the joint leaked no gas is described as follows. In order to ensure the galling resistance, the resin coating thickness was made to be larger than the thickness of surface preparation coating. Therefore, irregularities on the boundary surface of the metallic contact portion, which substantially conduct sealing, are made to be very smooth, and further a clearance between the sliding surfaces opposed to each other is filled with resin. Accordingly, even if grease is not used, it is possible to provide a high sealing property.

Figure 9:
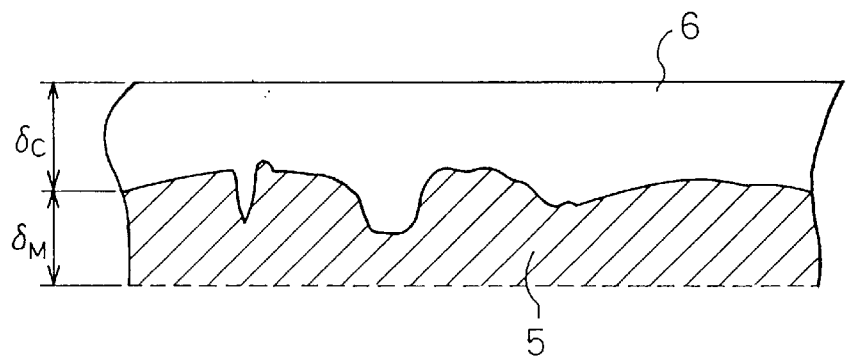
FIG. 9 is a schematic illustration showing a relation between the thickness of resin coating of the present invention and the thickness of a phosphate chemical formation coating layer.

FIG. 9 is a schematic illustration showing a relation between the thickness of resin coating of the present invention and the thickness of phosphate chemical formation coating layer. In order to accomplish the object of the present invention, the surface condition of a joint of steel pipe must satisfy the following inequality as illustrated in FIG. 9.

$$\delta_M < \delta_C$$

where $\delta_M$ is a coating thickness of the phosphate chemical formation coating layer 5 or a coating thickness of the nitriding layer and a phosphate chemical formation coating layer, and $\delta_C$ is a thickness of the resin coating layer 6, on which powder of molybdenum disulfide or tungsten disulfide is dispersed and mixed in resin, formed on the above surface preparation layer. That is, it is necessary to make the coating thickness $\delta_C$ of the resin coating layer larger than the coating thickness $\delta_M$ of the phosphate chemical formation coating layer or the coating thickness of the nitriding layer and the phosphate chemical formation coating layer. When $\delta_C$ is smaller than $\delta_M$, it is impossible to maintain the galling property of the joint, wherein maintaining the galling resistance is an object of the present invention, and further it is impossible to maintain the sealing property of the joint.

The coating thickness $\delta_M$ of the phosphate chemical formation coating layer is 5 to 30 μm, and the coating thickness $\delta_C$ of the resin coating layer is 10 to 45 μm as described before. Therefore, it is necessary to form both coating layers while the condition of $\delta_M < \delta_C$ can be maintained.

Figure 10:
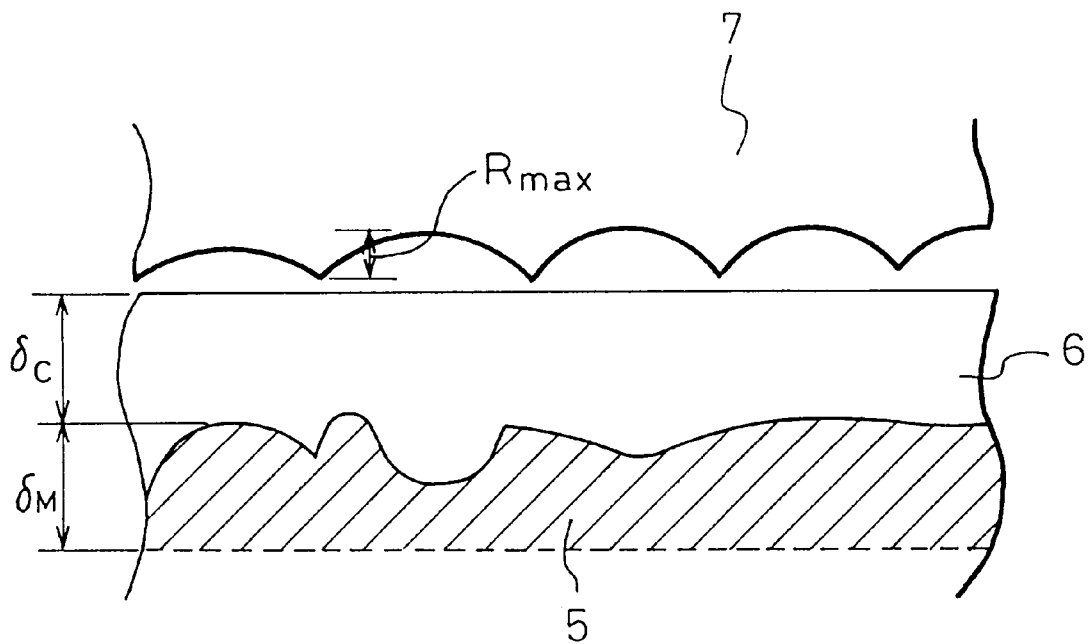
FIG. 10 is a schematic illustration showing a relation among the thickness of resin coating of the present invention, the thickness of a phosphate chemical formation coating layer, and the surface roughness of an opposing sliding surface.

FIG. 10 is a schematic illustration showing a relation among the thickness of resin coating of the present invention, the thickness of phosphate chemical formation coating layer, and the surface roughness of the opposing sliding surface. The following are the descriptions of the second invention to accomplish the object of the present invention. In order to accomplish the object of the present invention, the surface condition must satisfy the following inequality as illustrated in FIG. 10.

$$\delta_M < \delta_C$$

where $\delta_M$ is a coating thickness of the phosphate chemical formation coating layer 5 or a coating thickness of the nitriding layer and the phosphate chemical formation coating layer, and $\delta_C$ is a thickness of the resin coating layer 6, on which powder of molybdenum disulfide or tungsten disulfide is dispersed and mixed in resin, formed on the above surface preparation layer. Also, the surface roughness $R_{max}$ must be determined to satisfy the following inequality, $$R_{max} < \delta_C$$

where the surface roughness of the opposing sliding surface 7 is $R_{max}$. In other words, when the surface roughness $R_{max}$ of the opposing sliding surface is larger than the coating thickness $\delta_C$ of the resin coating layer, the joint leaks gas because there is provided no grease or lubricant on the surface of the joint of the present invention, so that the object of the present invention can not be accomplished.

Figure 11:
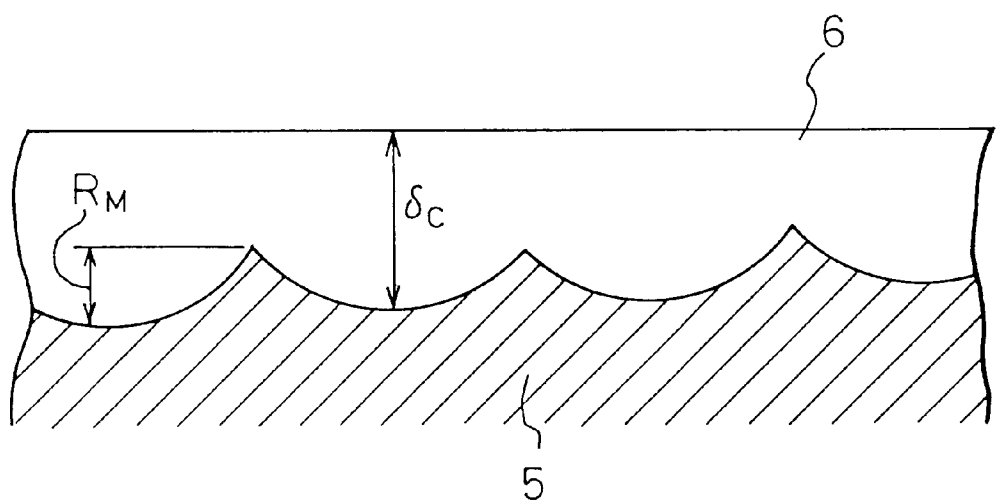
FIG. 11 is a schematic illustration showing a relation between the thickness of resin coating of the present invention and the surface roughness of a phosphate chemical formation coating layer.

FIG. 11 is a schematic illustration showing a relation between the thickness of resin coating of the present invention and the surface roughness of the phosphate chemical formation coating layer. In order to accomplish the object of the present invention, the surface condition must satisfy the following inequality as illustrated in FIG. 11.

$$R_M < \delta_C$$

where $R_M$ is a surface roughness of the phosphate chemical formation coating layer 5 or a surface roughness of the nitriding layer and the phosphate chemical formation coating layer, and $\delta_C$ is a thickness of the resin coating layer 6, on which powder of molybdenum disulfide or tungsten disulfide is dispersed and mixed in resin, formed on the above surface preparation layer. In other words, it is necessary to make the coating thickness $\delta_C$ of the resin coating layer larger than the surface roughness $R_M$ of the phosphate chemical formation coating layer or a surface roughness $R_M$ of the nitriding layer and the phosphate chemical formation coating layer. When $\delta_C$ is smaller than $R_M$, it is impossible to maintain the galling resistance which is an object to be accomplished by the present invention, and further it is also impossible to maintain the sealing property.

The surface roughness $R_M$ of this phosphate chemical formation coating layer is kept in a range from 3 to 30 µm. When the surface roughness $R_M$ of this phosphate chemical formation coating layer is lower than 3 µm, the adhesion property of the phosphate chemical formation coating layer to the resin layer is deteriorated. When the surface roughness $R_M$ of this phosphate chemical formation coating layer exceeds 30 µm, the thickness of the phosphate chemical formation coating layer is increased, and the tendency of generation of secondary crystals is remarkably strengthened, and the coating layer becomes fragile. Therefore, the adhesion property is deteriorated on the contrary. For the above reasons, the surface roughness $R_M$ of the phosphate chemical formation coating layer is restricted in a range from 3 to 30 µm in the present invention.

Figure 12:
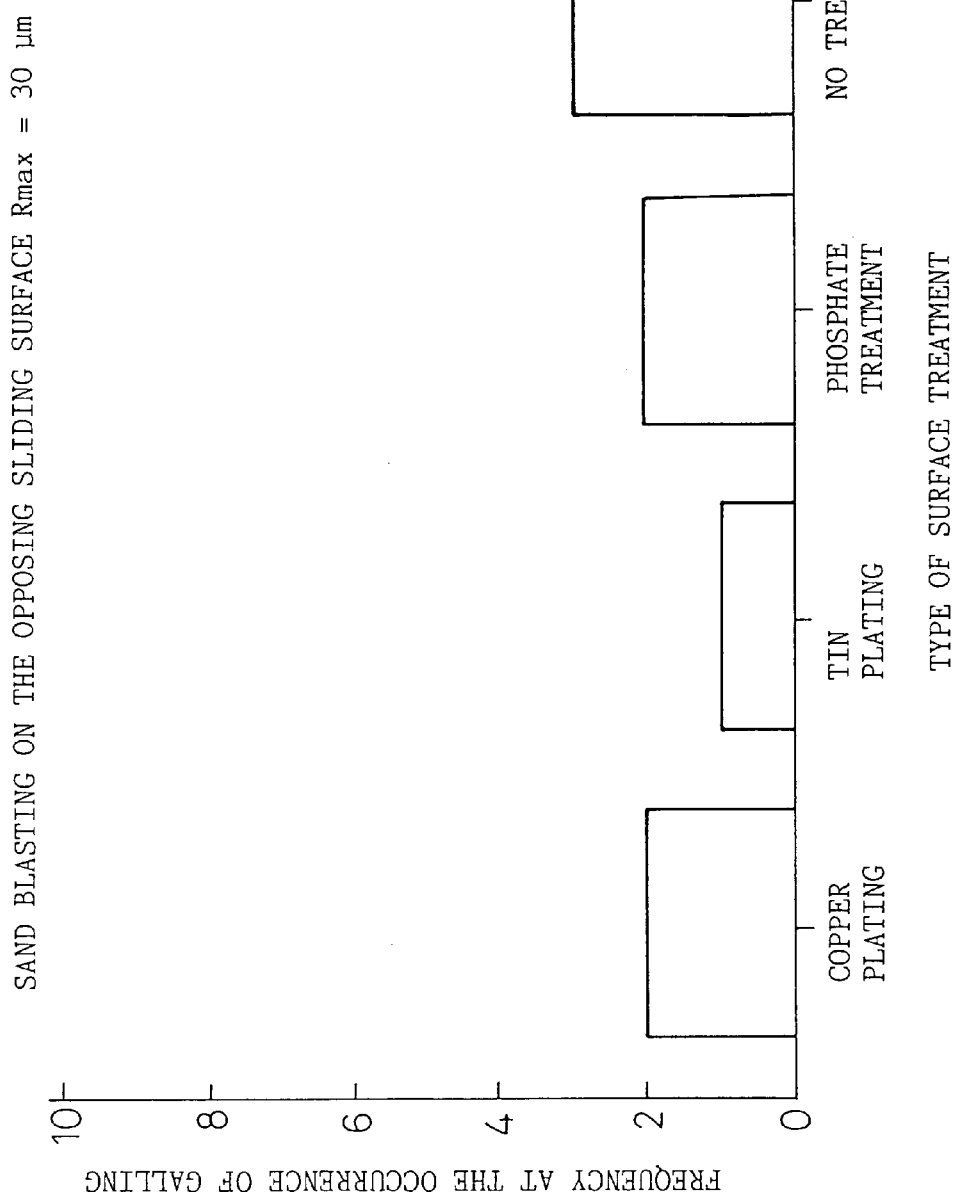
FIG. 12 is a graph showing a relation between the types of various surface treatment and the frequency of occurrence of galling in the case where sand blasting is conducted on an opposing sliding member.

The following methods are commonly used to enhance the galling resistance of the metallic contact portion of a joint. The surface roughness on the contact boundary surface is intentionally increased by conducting machining on the surface, or alternatively sand blasting is conducted on the surface to increase the surface roughness, so that the galling property can be enhanced without using a specific means of surface treatment. In the working environment in which compound grease is used, the above common method is effective to enhance the galling resistance. However, the above method, in which the surface condition of the opposing sliding member is changed in the manner described above, has not been evaluated under the condition of no lubricant. FIG. 12 is a graph showing a result of the experiment in which a pin, the surface of which was treated to the roughness of $R_{max}$=30 µm, was repeatedly fastened to and unfastened from a mother metal subjected to copper plating, under the condition of no lubricant. That is, FIG. 12 is a graph showing a relation between the methods of various surface treatment and the frequency of occurrence of galling in the case where sand blasting is conducted on the opponent sliding member. As can be seen on the graph, when sand blasting was conducted on the surface of an opposing sliding member, the galling resistance was deteriorated. The reason why the galling resistance was deteriorated is described as follows. Increasing the surface roughness aims at forming a clearance on the contact boundary surface so that compound grease can get into the clearance for enhancing the galling effect. Accordingly, under the condition of no lubricant, the above effect can not be provided. To make the matter worse, the surface treatment having the function of galling resistance has been worn away by conducting sand blasting.

Figure 13:
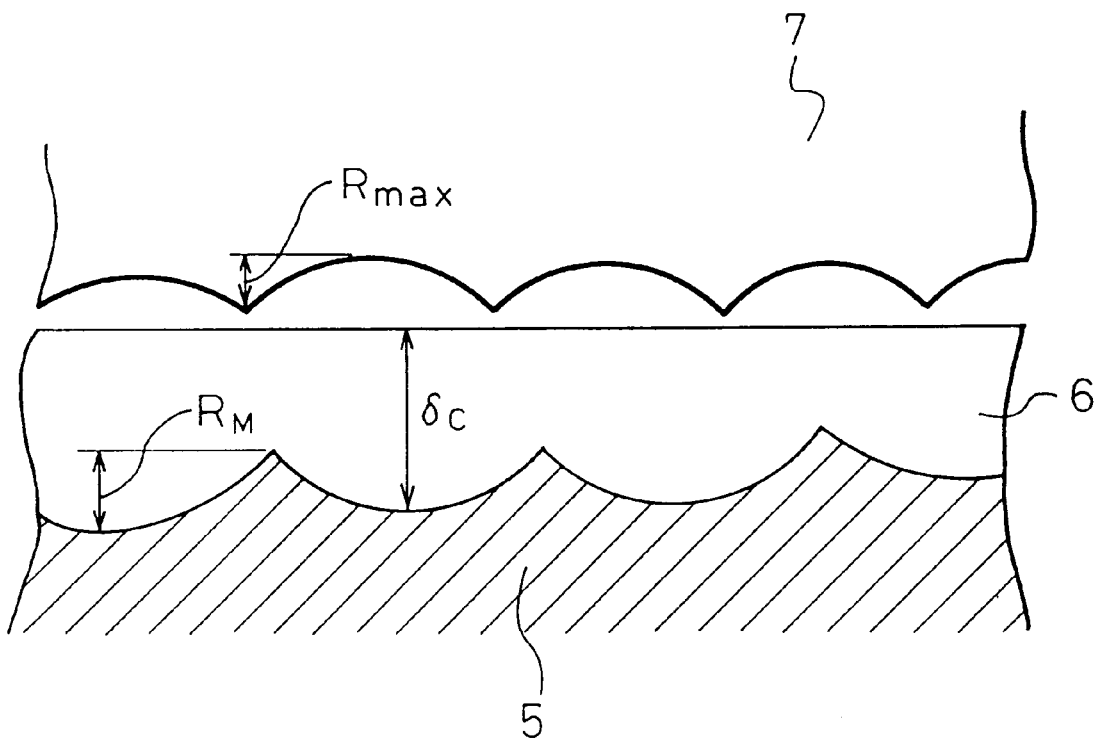
FIG. 13 is a schematic illustration showing a relation among the thickness of resin coating of the present invention, the surface roughness of a phosphate chemical formation coating layer, and the surface roughness of an opposing sliding surface.

FIG. 13 is a schematic illustration showing a relation between the thickness of resin coating of the present invention, the surface roughness of the phosphate chemical formation coating layer, and the surface roughness of the opponent sliding surface. The following are the descriptions of the second invention to accomplish the object of the present invention. In order to accomplish the object of the present invention, the surface condition must satisfy the following inequality as illustrated in FIG. 13.

$$R_M < \delta_C$$

where $R_M$ is a surface roughness of the phosphate chemical formation coating layer 5 or a surface roughness of the nitriding layer and the phosphate chemical formation coating layer, and $\delta_C$ is a thickness of the resin coating layer 6, on which powder of molybdenum disulfide or tungsten disulfide is dispersed and mixed in resin, formed on the above surface preparation layer. Also, the surface roughness $R_{max}$ must be determined to satisfy the following inequality, $$R_{max} < \delta_C$$

where the surface roughness of an opposing sliding surface 7 is $R_{max}$. In other words, when the surface roughness $R_{max}$ of the opposing sliding surface is larger than the coating thickness $\delta_C$ of the resin coating layer, the joint leaks gas because there is provided no grease or lubricant on the surface of the joint of the present invention, so that the object of the present invention cannot be accomplished. The surface roughness $R_{max}$ is maintained in a range from 1 to 25 µm. When the surface roughness $R_{max}$ is smaller than 1 µm, the production efficiency of joints is affected. When the surface roughness $R_{max}$ exceeds 25 µm, galling occurs since there is provided no lubricant, and the sealing property is deteriorated. Accordingly, the surface roughness $R_{max}$ of the opposing sliding surface is preferably maintained in a range from 1 to 25 µm. The mode of operation and the effect are shown in FIGS. 14 and 15.

Figure 14:
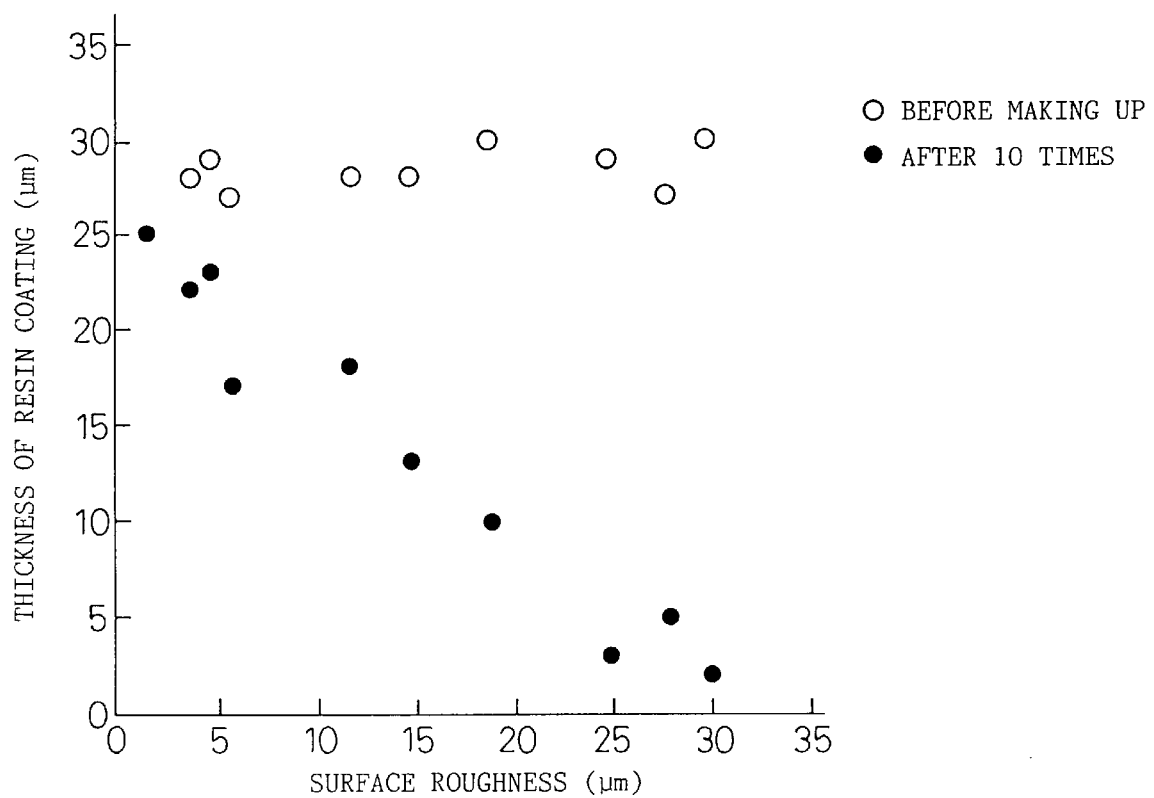
FIG. 14 is a graph showing a relation among the thickness of resin coating of the present invention, the surface roughness, and the galling resistance.

FIG. 14 is a graph showing a relation between the thickness of resin coating of the present invention, the surface roughness, and the galling resistance. In this case, the surface preparation was conducted by means of manganese phosphate chemical formation, and the resin layer was formed when powder of molybdenum disulfide or tungsten disulfide was dispersed and mixed in polyamideimide resin. On this graph, there are shown a resin coating thickness at the initial stage and a resin coating thickness after the joint had been fastened and unfastened 10 times. As can be seen on the graph, the more the surface roughness of the opposing sliding surface is increased, the more the coating thickness of the residual coating is reduced, and the galling resistance is deteriorated.

Figure 15:
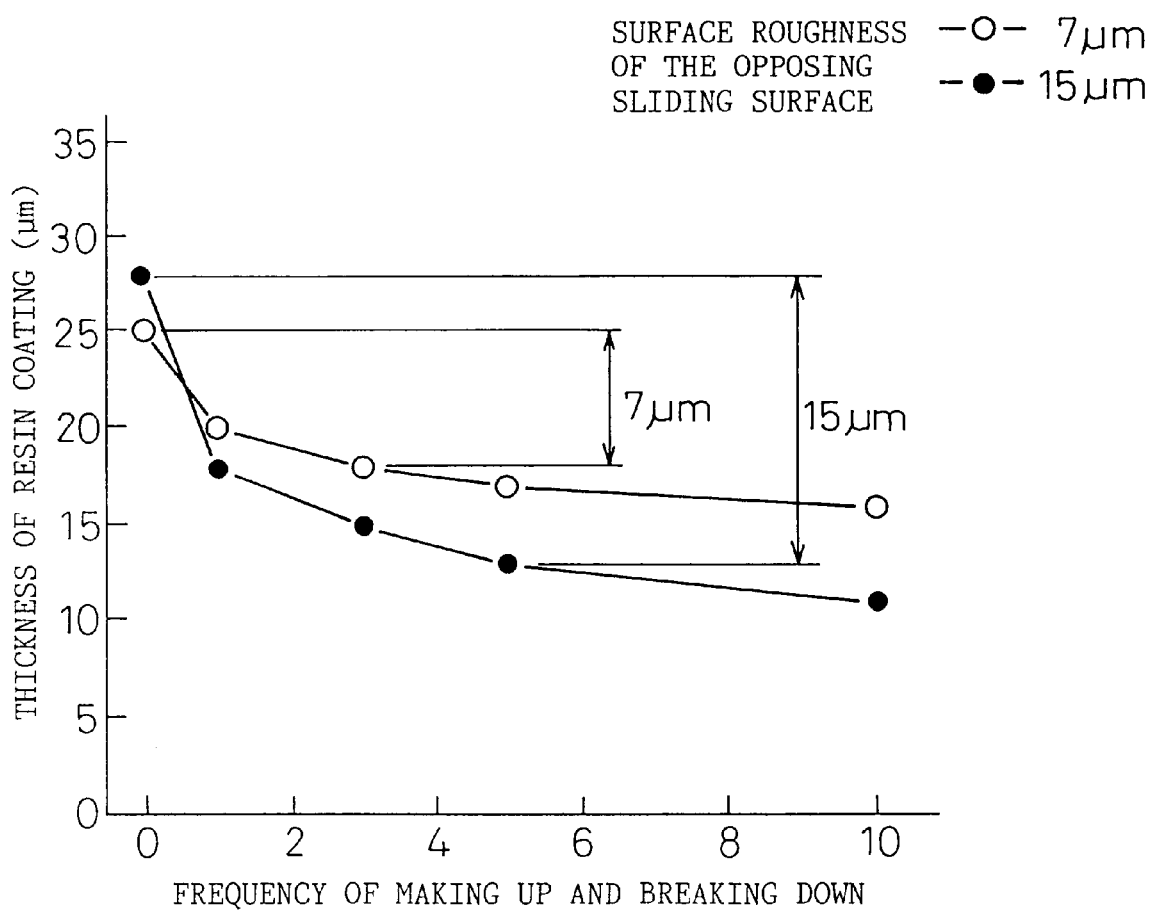
FIG. 15 is a graph showing a relation among the surface roughness, the frequency of making up and breaking out of a joint, and the reduction of thickness of resin coating.

FIG. 15 is a graph showing a relation between the surface roughness, the frequency of making-up and breaking-down of a joint, and the reduction of thickness of resin coating. FIG. 15 shows a process of reduction of the resin coating thickness when the operation of making-up and breaking-down is repeated. As can be seen on the graph of FIG. 15, when an amount of resin coating thickness which has worn away becomes the same as the roughness of the sliding surface, an amount of resin coating thickness to be worn away is reduced. Therefore, in order to provide the galling resistance stably, it is necessary to design a joint so that the coating thickness of the resin coating can be larger than the roughness of the sliding surface.

In the case of no lubricant, it is an essential condition to use a resin coating on which only powder of molybdenum disulfide or tungsten disulfide is dispersed as dispersing particles. However, when the above dispersing particles are used, the following problems may be encountered. That is, when the above dispersing particles are used, S is reacted with hydrogen contained in moisture, and hydrogen sulfide is generated. Therefore, when the mechanical strength of mother metal is high, stress corrosion cracking is caused. In order to solve the above problems, a corrosion inhibitor such as 2-polymericlinseed or 1-triethylenetriaminoimidazoline is dispersed in the resin, so that the occurrence of sulfide stress corrosion cracking can be prevented while the galling resistance is maintained high.

The present inventors found the following. When an appropriate amount of powder of Cu or Zn, or alternatively an appropriate amount of powder of both Cu and Zn is added to the solid lubricant, it is possible to enhance the galling resistance even if high surface pressure is given onto the solid lubricant coating layer. In the present invention, the above countermeasure is taken so as to enhance the galling resistance. Accordingly, when a solid lubricating coating layer is formed using the solid lubricant described in the present invention, both the lubricating property and the galling resistance can be enhanced, that is, the mechanical strength of the coating can be improved.

In the present invention, in order to enhance the adhesion property when the solid lubricating coating layer is exposed to the corrosion environment, that is, in order to enhance the adhesion property with time, further, in order to enhance the life of lubrication even after the solid lubricant coating layer has been worn away by the repetition of sliding under a high surface pressure, as a lower layer of the solid lubricant coating layer, there are provided a nitriding layer, an iron plating layer, an iron alloy plating layer containing one of Ni and Co or an iron alloy plating layer containing both Ni and Co, and a manganese phosphate chemical formation coating layer. That is, concerning a joint of steel pipe made of high Cr alloy steel which contains Cr, the amount of which is not less than 10% so that it is difficult to uniformly form a manganese phosphate chemical formation coating layer, there are provided a nitriding layer and an iron plating layer or an iron alloy plating layer. Accordingly, the manganese phosphate chemical formation coating layer can be uniformly formed, and joint performance can be enhanced by the effect provided by both the manganese phosphate chemical formation coating layer and the solid lubricant coating layer. On the manganese phosphate chemical formation coating layer, a large number of voids are generated among the generated crystal particles. Accordingly, the solid lubricant coating layer is formed under the condition that a large amount of the solid lubricant coating layer is trapped in the voids. As a result, it is possible to form a solid lubricant coating layer, the adhesion property of which is high, and further the adhesion property with time can be improved by the effect of inhibiting the corrosion of the manganese phosphate chemical formation coating layer. Even after the solid lubricant coating layer has worn away or become damaged, the lubricating performance can be maintained over a long period of time by the effect provided by both the manganese phosphate chemical formation processing layer and the sold lubricant coating layer which is trapped in the manganese phosphate chemical formation processing layer.

As described above, according to the method of the present invention, in a joint of steel pipe made of high Cr alloy steel, there are provided a nitriding layer, an iron plating layer or an iron alloy plating layer and a manganese phosphate chemical formation layer. Further, there is formed a solid lubricant coating layer of which the toughness, hardness and lubricating performance are high. Accordingly, it is possible to form a surface treatment coating layer of which the adhesion property, mechanical strength and lubricating performance are high, and the lubricating life of the surface treatment coating layer can be maintained over a long period of time. Therefore, when the joint of steel pipe made of high Cr alloy steel produced by the method of the present invention is very excellent in galling resistance, in abrasion resistance and in durability when it is used over a long period of time, that is, when it is subjected to the repetition of making up and breaking out a large number of times. In other words, according to the method of the present invention, it is possible to provide a joint of steel pipe, the galling resistance of which is high, so that the occurrence of galling can be prevented as compared with the conventional method even if the joint is repeatedly used over a long period of time.

A surface treatment method of producing the joint of steel pipe of the present invention will be described below in detail.

In the joint of steel pipe of the present invention, there is provided a manganese phosphate chemical formation coating layer of which the thickness is in a range from 5 to 30 $\mu$m, or alternatively there are provided a nitriding surface preparation layer of which the thickness is in a range from 1 to 20 $\mu$m, and a manganese phosphate chemical formation coating layer of which the thickness is in a range from 5 to 30 $\mu$m. When the thickness of the manganese phosphate chemical formation coating layer is smaller than 5 $\mu$m, the chemical formation coating layer cannot coat the surface sufficiently, and it is impossible to improve the adhesion property of the chemical formation coating layer to the solid lubricant coating layer and, especially when the joint is exposed to a corrosion environment over a long period of time, it is difficult to provide a sufficiently high adhesion property. Further, after the solid lubricating coating layer has worn away, it is impossible to provide a sufficiently high lubricating performance, that is, the enhancement of galling resistance, which is an object of the present invention. On the other hand, when the thickness of the manganese phosphate chemical formation processing layer exceeds 30 $\mu$m, the tendency of generating secondary crystals is remarkably strengthened, and the adhesion property of the coating layer itself is deteriorated, and the adhesion property of the solid lubricant coating layer is also deteriorated. Therefore, the thickness of the manganese phosphate chemical processing layer exceeding 30 $\mu$m is not preferable. For the above reasons, in the present invention, the thickness of the manganese phosphate chemical formation processing layer is restricted to a range from 5 to 30 $\mu$m, and preferably the thickness of the manganese phosphate chemical formation processing layer is restricted into a range from 10 to 20 $\mu$m.

In the present invention, as a surface preparation layer of the manganese phosphate chemical formation processing layer, there is provided a nitriding layer formed by dispersion treatment. The object of providing the nitriding layer is described as follows. When necessary, the adhesion strength of the manganese phosphate chemical formation processing layer can be further increased. The manganese phosphate chemical formation processing layer can be uniformly formed on a joint of steel pipe, the composition of which obstructs the uniform formation of the coating layer. The lubricating effect can be maintained over a long period of time after the solid lubricant coating layer has worn away.

In order to provide the above effect, the thickness of the surface preparation nitriding layer is restricted into a range from 1 to 20 μm. When the thickness of the surface preparation nitriding layer is smaller than 1 μm, defective portions are formed on the nitriding layer, so that the above effect can not be provided. Accordingly, the thickness of the surface preparation nitriding layer smaller than 1 μm is not preferable. On the other hand, when the thickness of the surface preparation nitriding layer exceeds 20 μm, the above effect is saturated. Since the hardness of the nitriding layer is high, the property of a joint of a steel pipe is deteriorated when the thickness of the surface preparation nitriding layer is increased. Accordingly, the thickness of the surface preparation nitriding layer exceeding 20 μm is not preferable. For the above reasons, in the present invention, the thickness of the surface preparation nitriding layer is restricted into a range from 1 to 20 μm. It is preferable that the thickness of the surface preparation nitriding layer is restricted into a range from 5 to 15 μm.

The method of forming a manganese phosphate chemical formation coating layer on a joint of steel pipe is not limited to the specific example. Also, the method of forming a surface preparation nitriding layer and a manganese phosphate chemical formation coating layer on a joint of steel pipe is not limited to the specific embodiment. Concerning the manganese phosphate chemical formation, the conventional manganese phosphate chemical formation method is applied, which is conducted for enhancing the galling resistance of a joint of steel pipe after the completion of surface cleaning process such as degreasing and acid cleaning or after the completion of surface activating process such as degreasing and shot blasting. For example, immediately after the above surface cleaning process or surface activating process, the manganese phosphate chemical formation is conducted, or alternatively after the above surface cleaning process or surface activating process, the pretreatment is conducted, and then the manganese phosphate chemical formation is conducted. Concerning the pretreatment bath, for example, bath of (titanium colloid-sodium pyrophosphate) or bath of (manganese colloid-sodium pyrophosphate), the concentration of which is 0.1 to 3.0 g/l, is used, however, the pretreatment bath is not limited to the specific example. The manganese phosphate chemical formation, which is successively conducted after the pretreatment bath, is not limited to the specific example in the present invention. Examples of the usable manganese phosphate chemical formation are: a chemical formation bath of ($Mn^{2+}$—$Ni^{2+}$—$PO_4^{3-}$—$NO_3^-$), the primary component of which is manganese primary phosphate; and ($Mn^{2+}$—$Ni^{2+}$—$Fe^{2+}$—$PO_4^{3-}$—$NO_3^-$—$F^-$). In the chemical formation bath, the coating layer is provided at a temperature from 75 to 98° C. in a treatment time corresponding to the thickness of the coating layer to be obtained.

Next, the methods of forming a surface preparation nitriding layer and a manganese phosphate chemical formation coating layer will be described below. The nitriding layer is provided as follows. First, a joint of a steel pipe is subjected to surface cleaning treatment and surface activating treatment such as degreasing, acid cleaning or degreasing, and shot blasting. Then, the joint is subjected to a bath of molten salt, the examples of the composition of which are described as follows.

| (A) | Bath NaCN | 25% |
|---|---|---|
| | KCN | 10% |
| | NaCNO | 25% |
| | KCNO | 10% |
| | $Na_2CO_3$ | 20% |
| | $K_2CO_3$ | 10% |
| (B) | Bath NaCNO | 10% |
| | KCNO | 45% |
| | $Na_2CO_3$ | 10% |
| | $K_2CO_3$ | 35% |

In the bath of molten salt, the above nitrogen compounds are contained. At a temperature in a range from 400 to 700° C., the joint of steel pipe is subjected to treatment in accordance with the size of the joint so that a predetermined thickness of the nitriding layer can be obtained.

After the completion of nitriding treatment, the joint of a steel pipe is subjected to a surface cleaning treatment such as degreasing and water washing, or alternatively the joint of a steel pipe is subjected to a surface cleaning treatment such as degreasing and water washing and a surface activating treatment. Then, by the same method as described above, the manganese phosphate chemical formation coating layer is formed. In order to accomplish the object of the present invention, in order to enhance the performance of preventing the occurrence of galling and seizing of the joint of steel pipe having the manganese phosphate chemical formation layer or having both the surface preparation nitriding layer and the manganese phosphate chemical formation layer, the solid lubricant coating layer is provided. In order to accomplish the object of the present invention, it is necessary that the adhesion property of the solid lubricant coating layer to the manganese phosphate chemical formation layer is high, and it is also necessary that the lubricating performance and the mechanical strength of the coating layer are high under the condition of high surface pressure.

Concerning the iron plating or alloy steel plating, examples of the composition of the treatment bath are: iron sulfate-iron chloride-Fe of ammonium chloride; iron sulfate-nickel chloride-iron borate-Ni alloy; iron sulfate-cobalt chloride-iron borate-Co alloy; iron sulfate-nickel chloride-cobalt chloride-Fe of ammonium chloride-Ni—Co alloy. Under the condition that the electric current density is 1 to 20 A/dm² and the temperature of bath is in a range from room temperature to 60° C., electric plating is conducted for a period of electrolytic time that has been previously set to obtain a predetermined thickness of plating. When plating of alloy steel is conducted, the plating composition is adjusted in such a manner that the amounts of $Ni^{2+}$ and $Co^{2+}$ to be added and the electric current density are appropriately determined.

In the present invention, in order to enhance the lubricating performance of a coating, a powder of molybdenum disulfide or tungsten disulfide, which is an essential component, is contained in the solid lubricant. Further, a binder is contained in the solid lubricant for the purpose of enhancing the adhesion property and the mechanical strength of the coating. Examples of usable binders are: epoxy resin, the molecular weight of which is 2000 to 10000; furan resin, the molecular weight of which is 150 to 250; and polyamideimide, the molecular weight of which is 10000 to 25000. In order to further enhance the abrasion resistance of the coating to be formed, when necessary, powder of Cu or Zn, or powder of both Cu and Zn is contained in the above solid lubricant.

In order to accomplish the object of the present invention, it is necessary to coat a solid lubricant on the joint to be treated. The solid lubricant contains powder of molybdenum disulfide or tungsten disulfide, the particle size of which is 0.45 to 10 $\mu$m, when it is measured by Fisher's Measurement Method. Also, the solid lubricant contains an organic resin, the composition of which is expressed by the following expression.

0.2≦{quantity of (powder of molybdenum disulfide or tungsten disulfide)}/{quantity of (one of epoxy resin, furan resin and polyamideimide resin)}≦9.0 (weight ratio). Then the coated solid lubricant layer is subjected to a heat treatment of baking in a range from 150 to 300° C. so as to form a solid lubricating coating layer of 10 to 45 $\mu$m thickness.

When the particle diameter of the powder of molybdenum disulfide or tungsten disulfide measured by Fisher's Measurement Method is smaller than 0.45 $\mu$m, it is impossible to enhance the lubricating performance by adding a powder of molybdenum disulfide or tungsten disulfide so as to prevent the occurrence of galling.

On the other hand, when the particle size exceeds 10 $\mu$m, the effect of enhancing the lubricating property by molybdenum disulfide or tungsten disulfide is saturated, and it becomes difficult to adjust the thickness of the solid lubricating coating layer. Accordingly, the particle size exceeding 10 $\mu$m is not preferable. Therefore, the particle diameter of powder of molybdenum disulfide or tungsten disulfide, which is measured by Fisher's Measurement Method, is restricted in a range from 0.45 to 10 $\mu$m. It is preferable that the particle diameter of powder of molybdenum disulfide or tungsten disulfide is restricted in a range from 2 to 5 $\mu$m. Concerning the organic resin binder composing the lubricant, the molecular weight of epoxy resin is restricted in a range from 2000 to 10000, the molecular weight of furan resin is restricted in a range from 150 to 250, and the molecular weight of polyamideimide is restricted in a range from 10000 to 25000. When the molecular weight of epoxy resin is smaller than 2000 and the molecular weight of furan resin is smaller than 150 and the molecular weight of polyamideimide is smaller than 10000, it is impossible to provide a sufficiently high toughness and hardness. When the molecular weight of epoxy resin exceeds 10000 and the molecular weight of furan resin exceeds 250 and the molecular weight of polyamideimide exceeds 25000, the effect of enhancing the toughness and hardness of the coating to be generated is saturated, and further it becomes difficult to coat the treatment agent uniformly, and furthermore the adhesion property of the generated coating to the manganese phosphate chemical formation coating is deteriorated. Accordingly, it is not preferable.

Therefore, the organic resin binder used for the lubricant applied to the formation of the solid lubricant coating layer of the present invention is restricted to: epoxy resin, the molecular weight of which is in a range from 2000 to 10000, preferably in a range from 3000 to 5000; furan resin, the molecular weight of which is in a range from 150 to 250, preferably in a range from 170 to 220; and polyamideimide resin, the molecular weight of which is in a range from 10000 to 25000, preferably in a range from 15000 to 20000. One of the above resins is selected and used for the present invention.

In order to accomplish the object of the present invention, concerning the solid lubricant to form the solid lubricant coating layer, a composition ratio of the powder of molybdenum disulfide or tungsten disulfide to the binder is important. In the present invention, the composition ratio is restricted by the following expression.

0.2≦{quantity of (powder of molybdenum disulfide or tungsten disulfide)}/{quantity of (one of epoxy resin, furan resin and polyamideimide resin)}≦9.0 (weight ratio).

When the composition ratio is smaller than 0.2, it is impossible to sufficiently enhance the lubricating performance of the solid lubricant coating layer to be formed. When the composition ratio exceeds 9.0, the adhesion property of the formed solid lubricant coating layer is deteriorated. Specifically, a powder of molybdenum disulfide or tungsten disulfide peels off from the coating layer. Therefore, the composition ratio exceeding 9.0 is not preferable.

Accordingly, the composition ratio of the powder of molybdenum disulfide or tungsten disulfide, which is an essential component for the formation of the solid lubricating processing layer, to the resin binder is preferably in a range from 0.5 to 3.0, and most preferably in a range from 0.8 to 2.0.

In the present invention, in order to further enhance the abrasion resistance of the formed solid lubricant coating layer, powder of Cu or Zn, or powder of both Cu and Zn is added to the treatment agent when necessary. The particle size of this powder is in a range from 0.5 to 10 $\mu$m, and an amount of powder of Cu or Zn to be added is in a range from 10 to 50 weight % with respect to an amount of powder of molybdenum disulfide or tungsten disulfide contained in the treatment agent. Even when powder of Cu or Zn, the particle size of which is smaller than 0.5 $\mu$m, is contained in the solid lubricant coating layer, the effect of enhancing the mechanical strength of the coating layer is small, and when the particle size of powder of Cu or Zn exceeds 10 $\mu$m, it becomes difficult to adjust the thickness of the solid lubricant coating layer.

When an amount of powder of Cu or Zn is smaller than 10 weight % with respect to an amount of powder of molybdenum disulfide or tungsten disulfide, the object of enhancing the abrasion resistance can not be accomplished. When an amount of powder of Cu or Zn exceeds 50 weight % with respect to an amount of powder of molybdenum disulfide or tungsten disulfide, the lubricating performance and the adhesion property of the generated solid lubricant coating layer to the manganese phosphate chemical formation processing layer are deteriorated.

Accordingly, when powder of Cu or Zn is added to the solid lubricant, the particle size is restricted into a range from 0.5 to 10 $\mu$m, and it is preferable that the particle size is restricted into a range from 0.8 to 6.5 $\mu$m, and the amount of powder of Cu or Zn to be added is restricted into a range from 10 to 50 weight % with respect to the amount of powder of molybdenum disulfide or tungsten disulfide, and it is preferable that the amount of powder of Cu or Zn to be added is restricted into a range from 20 to 42.5 weight % with respect to the amount of powder of molybdenum disulfide or tungsten disulfide.

The viscosity of the solid lubricant arranged in the above manner is adjusted in accordance with the coating thickness and the coating method. Then the solid lubricant is coated on a joint of steel pipe, the surface of which has been subjected to the manganese phosphate chemical formation, or both the surface preparation nitriding and the manganese phosphate chemical formation. The method of adjusting the viscosity of the solid lubricant, or the coating method of coating the solid lubricant is not limited to the specific example in the present invention. Conventional methods may be adopted. For example, ketone is used as solvent, so that the viscosity is adjusted, and then the solid lubricant is coated by means of spraying. Next, the joint of steel pipe coated with the solid lubricant is subjected to heating and baking. In the present invention, the method or condition of heating and baking is not limited to the specific example. The heating temperature may be arbitrarily determined in accordance with the properties of organic resin binder contained in the solid lubricant. Concerning the heating method, the conventional method may be adopted. Examples of usable heating methods are: hot blast drying, gas heating, electric heating, and infrared ray heating. Heating and baking is conducted in a temperature range from 150 to 300° C. It is preferable to conduct heating and baking in a temperature range from 180 to 270° C.

In this connection, the heating time may be arbitrarily determined in accordance with the size and shape of the joint of steel pipe. In order to reduce the heating time and prevent the occurrence of dripping of the solid lubricant in the process of baking conducted after the solid lubricant has been coated, the joint of steel pipe may be previously heated before the solid lubricant is coated on the joint of steel pipe.

By the methods explained above, thickness of the solid lubricant coating layer formed on the joint of steel pipe is restricted into a range from 10 to 45 $\mu$m. When the coating thickness is smaller than 10 $\mu$m, the object of enhancing the lubricating performance of the present invention can not be sufficiently accomplished. When the coating thickness is smaller than 10 $\mu$m, there is caused a problem in which the frequency of making up and breaking out of the joint of steel pipe is decreased. On the other hand, when the thickness of the coating layer exceeds 45 $\mu$m, the lubricating performance enhancing effect is saturated. Therefore, the thickness of the coating layer exceeding 45 $\mu$m is not economical. When the thickness of the coating layer exceeds 45 $\mu$m, the adhesion property of the solid lubricant coating layer tends to deteriorate, and the coating layer is peeled off. Accordingly, in the present invention, thickness of the solid lubricant coating layer is restricted into a range from 10 to 45 $\mu$m, and it is preferable that the thickness of the solid lubricant coating layer is restricted into a range from 15 to 30 $\mu$m.

When the solid lubricant coating layer is formed on the manganese phosphate chemical formation coating layer by the solid lubricant described above, the adhesive property of the solid lubricant coating layer to the manganese phosphate chemical formation coating layer is very high, so that the toughness and hardness of the coating layer can be enhanced, that is, it is possible to provide a coating of high mechanical strength and high lubricating performance. In the present invention, the solid lubricant coating layer is composed of a solid lubricant containing the powder of molybdenum disulfide or tungsten disulfide and the binder of polyamideimide resin, to which the powder of Cu or Zn is added. The thus formed solid lubricant coating layer is excellent in toughness and hardness as compared with the coating layer composed of other resins. Further, when powder of Cu is added, the abrasion resistance can be further enhanced, and it becomes possible to provide a higher effect. The mechanical strength of the thus formed solid lubricant coating layer is especially high. Accordingly, even when the solid lubricant coating layer is repeatedly slid under the condition of high surface pressure, the life of the coating can be extended. Accordingly, even when the joint of steel pipe is repeatedly made up and broken out, the solid lubricant coating layer of the present invention is very effective.

As described above, according to the present invention, it is possible to form a compound coating layer on a joint of steel pipe, including: a manganese phosphate chemical formation coating layer, or a surface preparation nitriding layer and a manganese phosphate chemical formation coating layer; and a solid lubricant coating layer, the mechanical strength and the lubricating performance of which are very high. When the effects of the above coating layers are added, it is possible to provide a joint of steel pipe, the galling resistance of which is very high. In this connection, the joint of steel pipe coated with a compound coating layer produced by the method of the present invention can be used in a normal working condition in which compound grease is coated on a metallic sealing portion and the joint is made up and broken out repeatedly. Further, the joint of steel pipe coated with a compound coating layer produced by the method of the present invention can be used in a working condition in which a sufficient amount of compound grease is not coated, or alternatively in a working condition in which no compound grease is coated intentionally. Even when the joint of steel pipe coated with a compound coating layer produced by the method of the present invention is used in the above conditions, galling of the coating seldom occurs, that is, it is possible to provide a high galling resistance.

It is possible to apply the present invention to a joint used for connecting oil well pipes. That is, the present invention can be applied to both a pin, which is composed of a thread portion formed at the end of an oil well pipe and a tapered portion formed in the base portion of the oil well pipe, and a coupling, which is composed of a thread portion engaged with the above thread portion and a tapered portion formed at the end. Alternatively, the present invention may be applied to one of them. Especially, the present invention may be applied to only the coupling. In the present invention, the structure of the coating on the thread joint used for an oil well pipe is described. Therefore, it should be noted that the present invention is not limited to a specific example of the combination of the coating and the shape of the joint.

Referring to the examples, the present invention will be explained in detail as follows.

EXAMPLES

Example 1

With respect to the box and the pin illustrated in FIG. 1 which are members to compose a joint of steel pipe, the respective screw portions and metal-metal contact portions were subjected to the treatment described as follows. As a surface preparation, on the contact boundary surface of the box, there was provided a manganese phosphate chemical formation coating layer, or there were provided a surface preparation nitriding layer and a manganese phosphate chemical formation coating layer. Alternatively, there was provided a surface preparation nitriding layer, and the thus provided surface preparation nitriding layer was subjected to sand blasting. Concerning the resin coating, there were provided a resin coating layer of molybdenum disulfide and polyamideimide resin, a resin coating layer of molybdenum disulfide and epoxy resin, and a resin coating layer of molybdenum disulfide and furan resin, wherein the ratios of composition were set at predetermined values. The thus provided solid lubricants were coated, and the thickness of the resin coating was changed. Table 1 shows the frequency of occurrence of galling when the roughness of the opposing sliding surfaces was changed. As can be seen on Table 1, in the test of an actual joint, in which the joint was repeatedly fastened and unfastened 20 times at the maximum under the condition of no lubricant, it was proved that the effect of the present invention was high. As can be seen on Table 1, under the condition of no lubricant, the sliding surface worked like a file. Accordingly, in the case of a resin coating on which powder of molybdenum disulfide is dispersed and mixed, it is necessary to form the resin coating so that the thickness can be larger than the roughness of the surface preparation, and also it is necessary to form the sliding surface so that the surface roughness can be smaller than the thickness of the resin coating.

1 and the pin 2 were broken out. After the completion of breaking out, the thread portions 3 and metal-metal sealing portions 4 of the box 1 and pin 2 were observed, and the condition of peeling of the surface treatment coating and the occurrence of galling were investigated.

As a result of investigation, when the coating was not peeled off and no galling occurred, or when the peeling and the galling were not so serious, the box 1 and the pin 2 were further engaged with each other and made up by the above fastening machine under the same condition.

In the manner described above, the joint to be evaluated was repeatedly made up and broken out until the coating peeled off and galling occurred. Investigation was made as to the maximum frequency of 20 times of making up and

TABLE 1

| | Surface preparation (Surface roughness of the coating) | | Resin coating (Coating thickness) | | Surface roughness of the relatively sliding surface | Frequency of the occurrence of galling | Remark |
|---|---|---|---|---|---|---|---|
| 1 | Nitriding Surface roughness of the manganese phosphate chemical formation coating layer | 2 μm 25 μm | Molybdenum disulfide/ polyamideimide resin | 28 μm | 7 μm | not less than 20 times | Present invention |
| 2 | Nitriding Surface roughness of the manganese phosphate chemical formation coating layer | 2 μm 20 μm | Molybdenum disulfide/ polyamideimide resin | 5 μm | 20 μm | 5 times | Comparative example |
| 3 | Nitriding Surface roughness of the manganese phosphate chemical formation coating layer | 2 μm 20 μm | Molybdenum disulfide/ polyamideimide resin | 7 μm | 7 μm | 8 times | |
| 4 | Nitriding Surface roughness of the manganese phosphate chemical formation coating layer | 2 μm 15 μm | Molybdenum disulfide/ polyamideimide resin | 20 μm | 7 μm | not less than 20 times | Present invention |
| 5 | Surface roughness of the manganese phosphate chemical formation coating layer | 5 μm | Molybdenum disulfide/ polyamideimide resin | 25 μm | 7 μm | not less than 20 times | |
| 6 | Surface roughness of the manganese phosphate chemical formation coating layer | 5 μm | Molybdenum disulfide/ polyamideimide resin | 15 μm | 3 μm | not less than 20 times | |
| 7 | Nitriding Surface roughness of the zinc phosphate chemical formation coating layer | 2 μm 12 μm | Molybdenum disulfide/ polyamideimide resin | 28 μm | 7 μm | not less than 20 times | |
| 8 | Sand blasting | 30 μm | Molybdenum disulfide/ polyamideimide resin | 20 μm | 7 μm | 7 times | Comparative example |
| 9 | Sand blasting | 20 μm | Molybdenum disulfide/ polyamideimide resin | 28 μm | 7 μm | 12 times | |
| 10 | Surface roughness of the manganese phosphate chemical formation coating layer | 5 μm | Molybdenum disulfide/ epoxy resin | 25 μm | 7 μm | not less than 20 times | Present invention |
| 11 | Surface roughness of the manganese phosphate chemical formation coating layer | 5 μm | Molybdenum disulfide/ furan resin | 25 μm | 7 μm | not less than 20 times | |

Example 2

An evaluation of the joint was made as follows. Concerning the joint of a steel pipe, that is, concerning the box (joint member) 1 and the pin (end portion of a steel pipe) 2, the respective thread portions 3 and the metal-metal sealing portions 4 were coated with the manganese phosphate chemical formation coating layer, or the surface preparation nitriding and the manganese phosphate chemical formation coating layer, and the solid lubricant coating layer according to the present invention. The thus produced joints were subjected to the evaluation test.

As illustrated in FIG. 2, the thus produced box 1 and the pin 2 to be evaluated were engaged with each other. Next, the box 1 and the pin 2 were made up by a fastening machine while a predetermined intensity of torque was given in accordance with the experiment condition. The box 1 and the pin 2 were slid on each other while the thread portion 3 and metal-metal sealing portion 4 were given a high surface pressure. After that, the box 1 and the pin 2 were turned in the opposite direction to that of making up, so that the box breaking out. In this connection, in the operation of making up and breaking out, the pin was turned at a rotational speed of 1 to 3 rpm with respect to the box.

There was provided a box 1 made of steel according to API P110, the inner diameter of which was 5.5 inches. Also, there was provided a pin 2, the size of which corresponded to the above box. The box 1 and the front end of the pin 2 were degreased in an aqueous degreasing agent and washed in water. Then they were cleaned in an aqueous solution of 12% HCl at the room temperature for 20 seconds and washed in water. Immediately after that, they were treated in the bath of manganese phosphate chemical formation of (9.5 g/1Mn$^{2+}$-0.15 g/1Ni$^{2+}$-1.0 g/1Fe$^{2+}$-36 g/1PO$_4^{3-}$-6.1 g/1NO$_3^-$-0.3 g/1F$^-$) at 95° C. for 10 minutes. Due to the above treatment, a manganese phosphate chemical formation processing layer was formed.

There was provided a solid lubricant, the principal components of which were powder of molybdenum disulfide, the average particle diameter of which was 2.5 μm, and epoxy resin, the average molecular weight of which was 4200, wherein the composition ratio was 1.3 (weight ratio). This solid lubricant was coated on the box 1 and the pin 2. Then they were subjected to heating and baking treatment at 180° C. for 20 minutes, so that a solid lubricant coating layer was formed.

That is, by the treatment of the present invention, a two layer type coating layer composed of the manganese phosphate chemical formation coating layer of 18 $\mu$m thickness and the solid lubricant coating layer of 16.5 $\mu$m thickness was formed in the thread portions 3 and the metallic sealing portions 4 of the box 1 and the pin 2 to be evaluated. The thread portions 3 and the metallic sealing portions 4 of the box 1 and the pin 2 were coated with compound grease stipulated by API BU15A2 Sec2. While the sealing portion 4 was given a surface pressure of 3000 kg/cm$^2$, the test of making up and breaking out was repeatedly conducted on the joint.

After the above test was repeated 15 times, no galling and seizing occurred in the sealing portion, however, galling and seizing occurred in the sixteenth test.

Comparative Example 1

There was provided a box 1 made of steel according to API P110, the inner diameter of which was 5.5 inches. Also, there was provided a pin 2, the size of which corresponded to the above box. The box 1 and the front end of the pin 2 were degreased in an aqueous degreasing agent and washed in water. Then they were cleaned in an aqueous solution of 12% HCl at the room temperature for 20 seconds and washed in water. Then, in the thread portions 3 and the metallic sealing portions 4 of the box 1 and the pin 2, only a solid lubricant coating layer of 16.5 $\mu$m thickness was formed from the solid lubricant used in Example 1. Comparative Example 1 was arranged in the above manner.

The comparative joint was evaluated under the same condition as that of Example 2. As a result of evaluation, the solid lubricant coating layer was considerably peeled off in the seventh test, and galling and seizing occurred in the eighth test.

Example 3

A box 1, the inner diameter of which was 7 inches, made of steel corresponding to N-80 was degreased in a solvent type degreasing agent and washed in water. Then it was subjected to the heating nitriding at 450° C. for 30 minutes in the molten salt bath of (20% NaCN-15% KCN-17.5% NaCNO-17.5% KCNO-10% Na$_2$CO$_3$-20% K$_2$CO$_3$). After that, the box 1 was cooled in an oil bath. The box 1 which had been subjected to the nitriding in the above manner was degreased in a solvent and cleaned in an aqueous solution of 5% H$_2$SO$_4$ at the room temperature for 5 seconds and then washed in water. After that, the box 1 was subjected to the pretreatment conducted in the bath of (titanium colloid-sodium pyrophosphate) of 0.8 g/l at room temperature for 2 minutes. Then, the box 1 was treated in the bath of manganese phosphate chemical formation of (8.7 g/1Mn$^{2+}$-0.2 g/1Ni$^{2+}$-0.6 g/1Fe$^{2+}$-32.3 g/1PO$_4^{3-}$-5.7 g/1NO$_3^-$-0.6 g/1F$^-$) at 90° C. for 15 minutes. By the above treatment, a manganese phosphate chemical formation coating layer was formed. There was provided a solid lubricant, the principal components of which were powder of molybdenum disulfide, the average particle diameter of which was 2.8 $\mu$m, and furan resin, the average molecular weight of which was 185, wherein the composition ratio was 2.5 (weight ratio). This solid lubricant was coated on the box 1. Then it was subjected to heating and baking treatment at 200° C. for 30 minutes, so that a solid lubricant coating layer was formed. That is, by the treatment of the present invention, a three layer type coating layer composed of the nitriding layer of 6.4 $\mu$m thickness, the manganese phosphate chemical formation coating layer of 14 $\mu$m thickness and the solid lubricant coating layer of 14 $\mu$m thickness was formed in the thread portion 3 and the metallic sealing portion 4 of the box 1 to be evaluated.

While the sealing portion 4 was given a surface pressure of 6000 kg/cm$^2$, the test of making up and breaking out was repeatedly conducted on the joint. After the above test was repeated 13 times, no galling and seizing occurred in the sealing portion, however, galling and seizing occurred in the fifteenth test.

Comparative Example 2

Concerning the box 1, the inner diameter of which was 7 inches, made of steel corresponding to N-80, a nitriding layer of 6.4 $\mu$m thickness and a manganese phosphate chemical formation coating layer of 14 $\mu$m thickness were provided in the thread portion 3 and the metallic sealing portion 4 by the same method as that of Example 3. There was provided a solid lubricant, the principal components of which were powder of molybdenum disulfide, the average particle diameter of which was 2.8 $\mu$m, and furan resin, the average molecular weight of which was 185, wherein the composition ratio was 0.15 (weight ratio). This solid lubricant was coated on the box 1 and it was subjected to heating and baking treatment at 200° C. for 30 minutes, so that a solid lubricant coating layer of 14 $\mu$m thickness was formed. The comparative example was arranged in the above manner.

The joint of the comparative example was evaluated under the same condition as that of Example 3. As a result of the evaluation, the lubricating property was not sufficiently high. When the test was repeated by 8 times, remarkable galling and seizing occurred. Therefore, the evaluation test was stopped.

Example 4

A box 1, the inner diameter of which was 7 inches, made of steel corresponding to T-90 was degreased in an aqueous degreasing agent and washed in water. After that, the box 1 was subjected to the pretreatment of blasting with glass beads (diameter: #100, pressure 5 kgf/cm$^2$, period; 60 seconds). Then the box 1 was subjected to the heating nitriding in the bath of (25% NaCN-10% KCN-25% NaCNO-10% KCNO-20% Na$_2$CO$_3$-10% K$_2$CO$_3$) at 570° C. for 20 minutes. Then it was cooled in an oil bath. The box 1 that had been subjected to the nitriding treatment was degreased in an aqueous degreasing agent and cleaned in an aqueous solution of 10% H$_2$SO$_4$ at the room temperature for 10 seconds and then washed. After that, the box 1 was subjected to the pretreatment conducted in the bath of (manganese colloid-sodium pyrophosphate) of 0.5 g/l at the room temperature for 20 seconds. Then, the box 1 was treated in the bath of manganese phosphate chemical formation of (8 g/1Mn$^{2+}$-0.3 g/1Ni$^{2+}$-0.2 g/1Fe$^{2+}$-29.5 g/1PO$_4^{3-}$-5.4 g/1NO$_3^-$-0.8 g/1F$^-$) at 85° C. for 13 minutes. By the above treatment, a manganese phosphate chemical formation coating layer was formed. There was provided a solid lubricant, the principal components of which were powder of molybdenum disulfide, the average particle diameter of which was 3.0 $\mu$m, and polyamide resin, the average molecular weight of which was 20000, wherein the composition ratio was 0.8 (weight ratio). This solid lubricant was coated on the box 1. Then it was subjected to heating and baking treatment at 250° C. for 30 minutes, so that a solid lubricant coating layer was formed. That is, by the treatment of the present invention, a three layer type coating layer composed of the nitriding layer of 10 μm thickness, the manganese phosphate chemical formation coating layer of 12 μm thickness and the solid lubricant coating layer of 18.5 μm thickness was formed in the thread portion 3 and the metallic sealing portion 4 of the box 1 to be evaluated.

While the sealing portion 4 was given a surface pressure of 6000 kg/cm², the test of making up and breaking out was repeatedly conducted on the joint. After the above test was repeated 15 times, no galling and seizing occurred in the sealing portion, however, galling and seizing occurred in the eighteenth test.

Comparative Example 3

Concerning the box 1, the inner diameter of which was 7 inches, made of steel corresponding to T-90, a nitriding layer of 10 μm thickness and a manganese phosphate chemical formation coating layer of 12 μm thickness were provided in the thread portion 3 and the metallic sealing portion 4 of the box portion 1 by the same method as that of Example 4. There was provided a solid lubricant, the principal components of which were powder of molybdenum disulfide, the average particle diameter of which was 3.0 μm, and polyamide resin, the average molecular weight of which was 20000, wherein the composition ratio was 9.5 (weight ratio). This solid lubricant was coated on the box 1 and it was subjected to heating and baking treatment at 200° C. for 30 minutes, so that a solid lubricant coating layer of 18.5 μm thickness was formed. The comparative example was arranged in the above manner.

In the same manner as Example 4, the joint of Comparative Example 3 was repeatedly made up and broken out for the test. As a result of the test, the solid lubricant coating layer was remarkably peeled off, so that the evaluation test was stopped at the seventh test.

Example 5

A box 1, the inner diameter of which was 7 inches, made of alloy steel of 9% Cr-1% Mo, was degreased in an aqueous degreasing agent. After that, the box 1 was subjected to the pretreatment of blasting with glass beads (diameter: #100, pressure 5 kgf/cm², period; 90 seconds). Then the box 1 was subjected to the heating nitriding in the bath of (25% NaCN-10% KCN-20% NaCNO-15% KCNO-20% $Na_2CO_3$-10% $K_2CO_3$) at 580° C. for 15 minutes. Then it was cooled in an oil bath. The box 1 that had been subjected to the nitriding treatment was degreased in an aqueous degreasing agent and cleaned in an aqueous solution of 10% $H_2SO_4$ at the room temperature for 5 seconds. After that, the box 1 was subjected to the pretreatment conducted in the pretreatment bath of (manganese colloid-sodium pyrophosphate) of 0.5 g/l at the room temperature for 2 minutes. Then, the box 1 was treated in the bath of manganese phosphate chemical formation of (9 g/1$Mn^{2+}$-0.2 g/1$Ni^{2+}$-0.6 g/1$Fe^{2+}$-33.5 g/1$PO_4^{3-}$-5.7 g/1$NO_3^-$-0.6 g/1$F^-$) at 88° C. for 10 minutes. By the above treatment, a manganese phosphate chemical formation coating layer was formed. Next, the box 1 was preliminarily heated at 175° C. for 15 minutes. There was provided a solid lubricant, the principal components of which were powder of molybdenum disulfide, the average particle diameter of which was 3.0 μm, and polyamide resin, the average molecular weight of which was 20000, wherein the composition ratio was 1.0 (weight ratio). This solid lubricant was coated on the box 1. Then it was subjected to heating and baking treatment at 240° C. for 30 minutes, so that a solid lubricant coating layer was formed. That is, by the treatment of the present invention, a three layer type coating layer composed of the nitriding layer of 11.5 μm thickness, the manganese phosphate chemical formation coating layer of 13.5 μm thickness and the solid lubricant coating layer of 20 μm thickness was formed in the thread portion 3 and the metallic sealing portion 4 of the box 1 to be evaluated.

The joint to be evaluated was tested as follows. Under the condition that no compound grease was coated on the thread portions 3 and the metallic sealing portions 4 of the pin 2 and the box 1, the joint was repeatedly made up and broken out while the seal portion 4 was given a surface pressure of 3500 kg/cm². After the joint had been made up and broken out by 12 times, peeling of the coating layer was relatively small, and no galling and seizing occurred in the sealing portion. However, at the thirteenth test, considerable galling and seizing occurred.

Comparative Example 4

A box 1, the inner diameter of which was 7 inches, made of alloy steel of 9% Cr-1% Mo was degreased in an aqueous degreasing agent, and then shot blasting was conducted as pretreatment on the inner surface of the box 1 so that the maximum surface roughness was adjusted to 25 μm. Next, the box 1 was preliminarily heated at 175° C. for 15 minutes. After that, a solid lubricant coating layer of 20 μm thickness was formed under the same condition as that of Example 5. Comparative Example 4 was arranged in the above manner.

In the same manner as Example 5, the joint of Comparative Example was repeatedly made up and broken out for the test. As a result, galling and seizing occurred remarkably in the fourth test, so that the evaluation test was stopped.

Example 6

A box 1, the inner diameter of which was 7 inches, made of steel corresponding to L-80 was degreased in an aqueous solution type degreasing agent and washed in water. Then the box 1 was cleaned in an aqueous solution of 10% $H_2SO_4$ at 50° C. for 10 seconds and then washed in water. After that, the box 1 was subjected to the pretreatment conducted in the pretreatment bath of (titanium colloid-sodium pyrophosphate) of 0.5 g/l at the room temperature for 1 minute. Then, the box 1 was treated in the bath of manganese phosphate chemical formation of (9.5 g/1$Mn^{2+}$-0.15 g/1$Ni^{2+}$-0.9 g/1$Fe^{2+}$-36 g/1$PO_4^{3-}$-6.1 g/1$NO_3^-$-0.5 g/1$F^-$) at 95° C. for 10 minutes. By the above treatment, a manganese phosphate chemical formation coating layer was formed. There was provided a solid lubricant, the principal components of which were powder of molybdenum disulfide, the average particle diameter of which was 4.0 μm and 1.0 μm, and polyamide resin, the average molecular weight of which was 16000, wherein the composition ratio was 1.1 (weight ratio). This solid lubricant was coated on the box 1 and it was subjected to heating and baking treatment at 260° C. for 25 minutes, so that a solid lubricant coating layer was formed. That is, by the treatment of the present invention, a two layer type coating layer composed of the manganese phosphate chemical formation coating layer of 15 μm thickness and the solid lubricant coating layer of 15 μm thickness was formed in the thread portion 3 and the metallic sealing portion 4 of the box 1 to be evaluated.

In the same manner as that of Example 3, the joint portion was tested in such a manner that it was repeatedly made up and broken out. At the eighteenth test, no galling and seizing occurred. However, at the nineteenth test, considerable galling and seizing occurred.

Comparative Example 5

Concerning the box 1, the inner diameter of which was 7 inches, made of steel corresponding to L-80, a manganese phosphate chemical formation coating layer of 15 μm thickness was provided in the thread portion 3 and the metallic sealing portion 4 of the box portion 1 by the same method as that of Example 6. There was provided a solid lubricant, the composition of which was the same as that of Example 6. This solid lubricant was coated on the box 1 and it was subjected to heating and baking treatment at 260° C. for 25 minutes, so that a solid lubricant coating layer of 5 μm thickness was formed. The comparative example was arranged in the above manner.

In the same manner as that of Example 6, the joint of Comparative Example 5 was repeatedly made up and broken out for the test. As a result of the test, considerable galling and seizing occurred at the tenth test, so that the evaluation test was stopped.

Example 7

A box 1, the inner diameter of which was 7 inches, made of steel corresponding to API P110, was degreased in an aqueous solution type degreasing agent and washed in water. Then the box 1 was cleaned in an aqueous solution of 15% $H_2SO_4$ at the room temperature for 18 seconds and then washed in water. Immediately after that, the box 1 was treated in the bath of manganese phosphate chemical formation of (9.5 g/1$Mn^{2+}$-0.15 g/1$Ni^{2+}$-0.4 g/1$Fe^{2+}$-36 g/1$PO_4^{3-}$-6.1 g/1$NO_3^-$-0.3 g/1$F^-$) at 90° C. for 20 minutes. By the above treatment, a manganese phosphate chemical formation coating layer was formed. Next, the box 1 was preliminarily heated at 180° C. for 15 minutes. There was provided a solid lubricant, the principal components of which were powder of molybdenum disulfide of the average particle diameter of 4.3 μm and powder of Cu of the average particle diameter of 1.0 μm and polyamide resin of the average molecular weight 20000, wherein the composition ratio was 1.0 (weight ratio). This solid lubricant was coated on the box 1 and it was subjected to heating treatment at 270° C. for 20 minutes, so that a solid lubricant coating layer was formed. That is, by the treatment of the present invention, a two layer type coating layer composed of the manganese phosphate chemical formation coating layer of 16 μm thickness and the solid lubricant coating layer of 17 μm thickness was formed in the thread portion 3 and the metallic sealing portion 4 of the box 1 to be evaluated.

In the same manner as that of Example 3, the joint portion was tested in such a manner that it was repeatedly made up and broken out. After the test had been repeated 20 times, galling and seizing seldom occurred in the sealing portion, that is, very good results were achieved in the test.

Comparative Example 6

A box 1, the inner diameter of which was 7 inches, made of steel corresponding to API P110 was degreased in an aqueous solution type degreasing agent and washed in water. After that, the inside of the box 1 was subjected to shot blasting for pretreatment, and the surface roughness was adjusted to the maximum surface roughness of 35 μm. By the same method as that of Example 7, a manganese phosphate chemical formation coating layer, the thickness of which was 16 μm, was formed on the thread portion 3 and the metallic sealing portion 4 of the box 1. Comparative Example was arranged in the above manner.

In the same manner as that of Example 7, the joint of Comparative Example was repeatedly made up and broken out for the test. As a result of the test, considerable galling and seizing occurred at the ninth test, so that the evaluation test was stopped.

Example 8

A box 1, the inner diameter of which was 7 inches, made of steel corresponding to L-80 was degreased in an aqueous solution type degreasing agent and washed in water. Then the box 1 was cleaned in an aqueous solution of 12.5% $H_2SO_4$ at the room temperature for 15 seconds and then washed in water. After that, the box 1 was subjected to a pretreatment conducted in a pretreatment bath of (manganese colloid-sodium pyrophosphate) of 0.3 g/l at the room temperature for 30 seconds. Then, the box 1 was treated in a bath of manganese phosphate chemical formation of (8 g/1$Mn^{2+}$-0.15 g/1$Ni^{2+}$-0.4 g/1$Fe^{2+}$-29.5 g/1$PO_4^{3-}$-6.1 g/1$NO_3^-$-0.7 g/1$F^-$) at 80° C. for 10 minutes. By the above treatment, a manganese phosphate chemical formation coating layer was formed. Next, the box 1 was preliminarily heated at 180° C. for 15 minutes. There was provided a solid lubricant, the principal components of which were powder of molybdenum disulfide of which the average particle diameter was 4.3 μm and powder of Cu of which the average particle diameter was 1.0 μm and polyamide resin of which the average molecular weight was 19000, wherein the composition ratio was 1.0 (weight ratio). This solid lubricant was coated on the box 1 and it was subjected to heating treatment at 270° C. for 20 minutes, so that a solid lubricant coating layer was formed. That is, by the treatment of the present invention, a two layer type coating layer composed of the manganese phosphate chemical formation coating layer of 10.5 μm thickness and the solid lubricant coating layer of 28.5 μm thickness was formed in the thread portion 3 and the metallic sealing portion 4 of the box 1 to be evaluated.

By the same method as that of Example 5, under the condition that no compound grease was coated on the thread portions 3 and the metallic sealing portions 4 of the pin 2 and the box 1, the joint was repeatedly made up and broken out while the seal portion 4 was given a surface pressure of 4000 kg/cm². After the joint had been made up and broken out by 13 times, galling and seizing seldom occurred in the sealing portion. However, at the fourteenth test, considerable galling and seizing occurred.

Comparative Example 7

A manganese phosphate chemical formation coating layer of 10.5 μm thickness was formed by the same method as that of Example 8 in the thread portion 3 and the metallic sealing portion 4 of a box 1, the inner diameter of which was 7 inches, made of steel corresponding to L-80. Comparative Example was arranged in the above manner.

By the same method as that of Example 8, under the condition that no compound grease was coated on the thread portions 3 and the metallic sealing portions 4, the joint was repeatedly made up and broken out while the seal portion 4 was given a surface pressure of 4000 kg/cm². After the joint had been made up and broken out 3 times, considerable galling and seizing occurred. Therefore, the evaluation test was stopped.

Example 9

A nitriding layer and a manganese phosphate chemical formation coating layer were formed by the same method and treatment condition as those of Example 5 on a box 1, the inner diameter of which was 7 inches, made of steel corresponding to T-90. Next, the box 1 was preliminarily heated at 160° C. for 20 minutes. There was provided a solid lubricant, the principal components of which were powder of molybdenum disulfide of which the average particle diameter was 3.5 μm and powder of Cu of which the average particle diameter was 0.8 μm and powder of Zn of which the average particle diameter was 5.0 μm and polyamide resin of which the average molecular weight was 18000, wherein the composition ratio was 1.2 (weight ratio). This solid lubricant was coated on the box 1. Then it was subjected to heating treatment at 250° C. for 25 minutes, so that a solid lubricant coating layer was formed.

That is, by the treatment of the present invention, a three layer type coating layer composed of the nitriding layer of 11.5 μm thickness and the manganese phosphate chemical formation coating layer of 13.5 μm thickness and the solid lubricant coating layer of 18.5 μm thickness was formed in the thread portion 3 and the metallic sealing portion 4 of the box 1 to be evaluated.

By the same method as that of Example 3, the joint was repeatedly made up and broken out for the test. After the joint had been made up and broken out 20 times, galling and seizing seldom occurred in the sealing portion, that is, very good results were achieved.

Example 10

Table 2 shows the composition of high Cr alloy steel, the Cr content of which is not less than 10%. Joints of steel pipes to be evaluated were made of the above Cr alloy steel. Concerning the box (joint member) 1 and the pin (joint portion of the steel pipe end) 2, on the thread portion 3 and the metal-metal seal portion 4 of only the box 1, or on the thread portions 3 and the metal-metal seal portions 4 of both the box 1 and pin 2, there were provided a nitriding layer, a surface preparation layer of iron plating or iron alloy plating, a manganese phosphate chemical formation coating layer and a solid lubricant coating layer of according to the present invention. The thus produced joints were subjected to the evaluation test. In the evaluation test, the joint to be evaluated was repeatedly made up and broken out until the coating on the joint peeled off or galling occurred. The frequency of repetition was 15 at the maximum so as to make an evaluation. In this connection, in the evaluation test, when the joint was repeatedly made up and broken out, the pin was turned with respect to the coupling at the rotational speed of 1 to 3 rpm.

TABLE 2

|  | C | Si | Mn | P | S | Cu | Cr | Ni | Mo | Ti | Al | N (wt/%) |
|---|---|---|---|---|---|---|---|---|---|---|---|---|
| Tested steel A | 0.19 | 0.36 | 0.44 | 0.012 | 0.004 | 0.02 | 12.93 | 0.13 | 0.01 | Trace | 0.024 | 0.027 |
| Tested steel B | 0.05 | 0.33 | 0.13 | 0.018 | 0.002 | 0.03 | 16.14 | 0.08 | 0.02 | 0.003 | 0.124 | 0.011 |
| Tested steel C | 0.02 | 0.45 | 0.28 | 0.008 | 0.006 | 0.01 | 25.18 | 7.52 | 2.80 | 0.05 | 0.028 | 0.017 |

Comparative Example 8

A nitriding layer and a manganese phosphate chemical formation coating layer were formed by the same method as that of Example 5 in the thread portion 3 and the metallic sealing portion 4 of a box 1, the inner diameter of which was 7 inches, made of steel corresponding to T-90. The comparative Example was arranged in the above manner. That is, in the same manner as that of Examples 5 and 9, on the box 1, there were provided a nitriding layer of 11.5 μm thickness and a manganese phosphate chemical formation layer of 13.5 μm thickness, and the thus provided comparative example was evaluated.

By the same method as that of Example 9, under the condition that compound grease was coated, the joint of the comparative example was repeatedly made up and broken out while the sealing portion 4 was given a surface pressure of 4000 kg/cm². After the joint had been made up and broken out 10 times, remarkable galling and seizing occurred. Therefore, the evaluation test was stopped.

As described above, the joint of steel pipe of the present invention is composed of a compound coating layer including: a manganese phosphate chemical formation layer, or a surface preparation nitriding layer and a manganese phosphate chemical formation layer; and a solid lubricant coating layer. The coating layer of the thus composed joint is excellent in the adhesive property, mechanical strength and lubricating property. Accordingly, even when the frequency of repetition of making up and breaking out increases, galling and seizing of the coating layer seldom occur. That is, the joint of steel pipe of the present invention is excellent in galling resistance.

A box 1, the inner diameter of which was 5.5 inches, made of the tested steel A, and a front end portion of the pin 2, the size of which corresponded to the box 1, were degreased in a solvent type degreasing agent. After that, the box 1 and the pin 2 were subjected to the heating nitriding treatment in a bath of molten salt of (20% NaCN-15% KCN-17.5% NaCNO-17.5% KCNO-10% $Na_2CO_3$-20% $K_2CO_3$) at 450° C. for 30 minutes. Then, they were cooled in an oil bath. The members which had been subjected to the nitriding treatment in the above manner were degreased in a solvent and cleaned in an aqueous solution of 5% $H_2SO_4$ at room temperature for 5 seconds and washed in water. After that, the box 1 and the pin 2 were subjected to the pretreatment conducted in the pretreatment bath of (titanium colloid-sodium pyrophosphate) of 0.8 g/l at the room temperature for 2 minutes. Then, they were treated in the bath of manganese phosphate chemical formation of (8.7 g/1$Mn^{2+}$-0.2 g/1$Ni^{2+}$-0.6 g/1$Fe^{2+}$-32.3 g/1$PO_4^{3-}$-5.7 g/1$NO_3^-$-0.6 g/1$F^-$) at 90° C. for 10 minutes. By the above treatment, a manganese phosphate chemical formation coating layer was formed.

There was provided a solid lubricant, the principal components of which were powder of molybdenum disulfide, the average particle diameter of which was 2.5 μm, and epoxy resin, the average molecular weight of which was 4200, wherein the composition ratio was 1.3 (weight ratio). This solid lubricant was coated on the box 1 and the pin 2 and it was subjected to heating and baking treatment at 180° C. for 20 minutes, so that a solid lubricant coating layer was formed.

That is, by the treatment of the present invention, a three layer type coating layer composed of the nitriding layer of 6.4 μm thickness, the manganese phosphate chemical formation coating layer of 13 μm thickness and the solid lubricant coating layer of 16.5 μm thickness was formed in the thread portions 3 and the metallic sealing portions 4 of the box 1 and the pin 2 to be evaluated. The joint to be evaluated was tested as follows. Under the condition that compound grease corresponding to API BU15A2 Sect2 was coated on the thread portions 3 and the metallic sealing portions 4 of the coupling 1 and the pin 2, the joint was repeatedly made up and broken out while the seal portion 4 was given a surface pressure of 3000 kg/cm$^2$.

After the joint had been repeatedly made up and broken out by 10 times, no galling and seizing occurred in the joint. However, at the eleventh test, considerable galling and seizing occurred.

Comparative Example 9

A box 1, the inner diameter of which was 5.5 inches, and a front end portion of a pin 2, both were made of the tested steel A, were degreased in a solvent. After that, the thread portions 3 and the metallic sealing portions 4 of the box 1 and the pin 2 were subjected to grit blasting, and the maximum surface roughness was adjusted to be 35 μm. After the completion of grit blasting, the thread portions 3 and the metallic sealing portions 4 of the box 1 and the pin 2 were washed in water. After that, they were subjected to the pretreatment conducted in a pretreatment bath of (titanium colloid-sodium pyrophosphate) of 0.8 g/l. Then, they were treated in the bath of manganese phosphate chemical formation of (8.7 g/1Mn$^{2+}$-0.2 g/1Ni$^{2+}$-0.6 g/1Fe$^{2+}$-32.3 g/1PO$_4^{3-}$-5.7 g/1NO$_3^-$-0.6 g/1F$^-$) at 90° C. for 10 minutes.

However, the manganese phosphate chemical formation coating layer was seldom formed on the members of Comparative Example. The evaluation test was made under the same condition as that of Example 10. As a result of the evaluation test, remarkable galling and seizing occurred at the second test. Therefore, the evaluation test was stopped.

Example 11

A box 1, the inner diameter of which was 7 inches, made of the tested steel C was degreased in an aqueous solution type degreasing agent and cleaned in an aqueous solution of (10% HNO$_3$+1% HF) at room temperature for 30 seconds. After the box 1 had been washed in water, it was dipped in the electroplating bath of (250 g/1FeSO$_4$.7H$_2$O-42 g/1FeCl$_2$.4H$_2$O-20 g/NH$_4$Cl) and electrolysis was conducted for 60 seconds by the electric current density of 10 A/dm$^2$. In this way, an iron plating layer was formed on the box 1. Immediately after the box 1 had been washed in water, the box 1 was treated in the bath of manganese phosphate chemical formation of (9.5 g/1Mn$^{2+}$-0.15 g/1Ni$^{2+}$-1.0 g/1Fe$^{2+}$-36 g/1PO$_4^{3-}$-6.1 g/1NO$_3^-$-0.3 g/1F$^-$) at 95° C. for 10 minutes. By the above treatment, a manganese phosphate chemical formation coating layer was formed. There was provided a solid lubricant, the principal components of which were powder of molybdenum disulfide, the average particle diameter of which was 2.8 μm, and furan resin, the average molecular weight of which was 185, wherein the composition ratio was 1.8 (weight ratio). This solid lubricant was coated on the box 1 and it was subjected to heating and baking treatment at 200° C. for 30 minutes, so that a solid lubricant coating layer was formed. That is, by the treatment of the present invention, a three layer type coating layer composed of the iron plating layer of 1.5 μm thickness, the manganese phosphate chemical formation coating layer of 18 μm thickness and the solid lubricant coating layer of 15 μm thickness was formed in the thread portion 3 and the metallic sealing portion 4 of the box 1.

In the same manner as that of Example 10, while the joint portion was coated with compound grease and the sealing portion was given a surface pressure of 4000 kg/cm$^2$, the joint portion was repeatedly made up and broken out for the test. Until the eleventh test was completed, galling and seizing seldom occurred in the sealing portion. However, at the twelfth test, considerable galling and seizing occurred.

Comparative Example 10

A box 1, the inner diameter of which was 7 inches, made of the tested steel C was subjected to the same pretreatment as that of Example 11. After that, the iron plating layer of 1.5 μm thickness and the manganese phosphate chemical formation layer of 18 μm thickness were formed under the same condition. Further, the same solid lubricant as that of Example 2 was coated on the box 1. Then the box 1 was subjected to the heating and baking treatment at 200° C. for 30 minutes. In this way, the solid lubricant coating layer of 5 μm thickness, the composition of which was the same as that of Example 11, was formed in the comparative example.

The thus provided joint of the comparative example was evaluated in the same evaluation test as that of Example 11. As a result of the evaluation test, galling and seizing occurred remarkably at the eighth test. Therefore, the evaluation test was stopped.

Example 12

A coupling (box) 1, the inner diameter of which was 7 inches, made of the tested steel B was degreased in an aqueous degreasing agent. After that, the box 1 was subjected to the pretreatment of blasting with glass beads (diameter: #100, pressure: 5 kgf/cm$^2$, period: 60 seconds). Then the box 1 was subjected to the heating nitriding in the bath of (25% NaCN-10% KCN-25% NaCNO-10% KCNO-20% Na$_2$CO$_3$-10% K$_2$CO$_3$) at 570° C. for 20 minutes. Then it was cooled in an oil bath. The box 1 that had been subjected to the nitriding treatment was degreased in an aqueous degreasing agent and cleaned in an aqueous solution of 10% H$_2$SO$_4$ at the room temperature for 10 seconds and then washed in water. After that, the box 1 was subjected to the pretreatment conducted in the bath of (manganese colloid-sodium pyrophosphate) of 0.5 g/l at room temperature for 20 seconds. Then, the box 1 was treated in the bath of manganese phosphate chemical formation of (8 g/1Mn$^{2+}$-0.3 g/1Ni$^{2+}$-0.2 g/1Fe$^{2+}$-29.5 g/1PO$_4^{3-}$-5.4 g/1NO$_3^-$-0.3 g/1F$^-$) at 85° C. for 13 minutes. By the above treatment, a manganese phosphate chemical formation coating layer was formed. There was provided a solid lubricant, the principal components of which were powder of molybdenum disulfide, the average particle diameter of which was 3.0 μm, and polyamide resin, the average molecular weight of which was 20000, wherein the composition ratio was 0.8 (weight ratio). This solid lubricant was coated on the box 1. Then it was subjected to heating and baking treatment at 250° C. for 30 minutes, and a solid lubricant coating layer was formed. That is, by the treatment of the present invention, a three layer type coating layer composed of the nitriding layer of 10 μm thickness, the manganese phosphate chemical formation coating layer of 12 μm thickness and the solid lubricant coating layer of 15 μm thickness was formed in the thread portion 3 and the metallic sealing portion 4 of the box 1 to be evaluated.

In the same manner as that of Example 11, the joint portion was repeatedly made up and broken out for the test.

Until the thirteenth test was completed, galling and seizing seldom occurred in the joint. However, at the fourteenth test, considerable galling and seizing occurred.

Comparative Example 11

Concerning a box 1, the inner diameter of which was 7 inches, made of the tested steel B, the nitriding layer of 10 μm thickness and the manganese phosphate chemical formation coating layer of 12 μm thickness were provided in the thread portion 3 and the metallic sealing portion 4 of the box portion 1 by the same method as that of Example 12. There was provided a solid lubricant, the principal components of which were powder of molybdenum disulfide, the average particle diameter of which was 3.0 μm, and polyamide resin, the average molecular weight of which was 20000, wherein the composition ratio was 9.5 (weight ratio). This solid lubricant was coated on the box 1. Then it was subjected to heating and baking treatment at 200° C. for 30 minutes, and a solid lubricant coating layer of 15 μm thickness was formed. The comparative example was arranged in the above manner. In the same manner as that of Example 11, the joint of Comparative Example was repeatedly made up and broken out for the test. As a result of the test, the solid lubricant coating layer was remarkably peeled off, so that the evaluation test was stopped at the sixth test.

Example 13

A box 1, the inner diameter of which was 7 inches, made of the tested steel B was degreased in an aqueous degreasing agent and cleaned in an aqueous solution of (10% $HNO_3$+ 1% HF) at the room temperature for 45 seconds. After the box 1 had been washed in acid, it was dipped in the electroplating bath of (330 g/1$FeSO_4.7H_2O$-10 g/1$NiCl_2.6H_2O$-10 g/1$CoCl_2.6H_2O$-20 g/1$NH_4Cl$) and electrolysis was conducted for 130 seconds by the electric current density of 7.5 A/$dm^2$. In this way, the Fe-1% Ni-1% Co alloy plating layer was formed. Next, the box 1 was washed in water and cleaned in the acid of 10% $H_2SO_4$ and washed in water. Immediately, the box 1 was treated in the bath of manganese phosphate chemical formation of (8 g/1$Mn^{2+}$-0.3 g/1$Ni^{2+}$-0.7 g/1$Fe^{2+}$-29.5 g/1$PO_4^{3-}$-5.4 g/1$NO_3^-$-0.5 g/1$F^-$) at 92° C. for 15 minutes. By the above treatment, a manganese phosphate chemical formation coating layer was formed. There was provided a solid lubricant, the principal components of which were powder of molybdenum disulfide, the average particle diameter of which was 3.5 μm, and polyamide resin, the average molecular weight of which was 18000, wherein the composition ratio was 1.8 (weight ratio). This solid lubricant was coated on the box 1. Then it was subjected to heating and baking treatment at 260° C. for 25 minutes, and a solid lubricant coating layer was formed. That is, by the treatment of the present invention, a three layer type coating layer composed of an alloy plating layer of Fe-1% Ni-1% Ni-1% Co of 2.5 μm thickness, a manganese phosphate chemical formation coating layer of 17 μm thickness and a solid lubricant coating layer of 12 μm thickness was formed in the thread portion 3 and the metallic sealing portion 4 of the box 1 to be evaluated.

In the same manner as that of Example 11, the joint portion was repeatedly made up and broken out for the test. Until the twelfth test was completed, no galling and seizing occurred in the joint. However, at the thirteenth test, considerable galling and seizing occurred.

Comparative Example 12

Concerning a box 1, the inner diameter of which was 7 inches, made of the tested steel B, the alloy plating layer of Fe-1% Ni-1% Co of 2.5 μm thickness and the manganese phosphate chemical formation coating layer of 17 μm thickness were provided in the thread portion 3 and the metallic sealing portion 4 of the box portion 1 by the same method as that of Example 12. There was provided a solid lubricant, the principal components of which were powder of molybdenum disulfide, the average particle diameter of which was 3.5 μm, and polyamide resin, the average molecular weight of which was 18000, wherein the composition ratio was 0.15 (weight ratio). This solid lubricant was coated on the box 1. Then it was subjected to heating and baking treatment at 250° C. for 30 minutes, so that a solid lubricant coating layer of 12 μm thickness was formed. The comparative example was arranged in the above manner. In the same manner as that of Example 11, the joint of Comparative Example was repeatedly made up and broken out for the test. As a result of the test, the lubricating performance of the solid lubricant coating layer was not sufficiently enhanced, and remarkable galling and seizing occurred in the fifth test. Therefore, the evaluation test was stopped.

Example 14

A box 1, the inner diameter of which was 7 inches, made of the tested steel C was degreased in an aqueous degreasing agent and cleaned in an aqueous solution of (10% $HNO_3$+ 1% HF) at room temperature for 60 seconds. After the box 1 had been washed in acid, it was dipped in the electroplating bath of (300 g/1$FeSO_4.7H_2O$-35 g/1$NiCl_2.6H_2O$-30 g/1$H_3BO_3$) and electrolysis was conducted for 82.5 seconds at an electric current density of 15 A/$dm^2$. In this way, the alloy plating layer of Fe—Ni, the Ni content of which was 3.5%, was provided. Next, the box 1 was washed in water and cleaned in an acid of 3% $H_2SO_4$ and washed in water. Immediately after that, the box 1 was treated in the bath of manganese phosphate chemical formation of (8.7 g/1$Mn^{2+}$- 0.2 g/1$Ni^{2+}$-0.6 g/1$Fe^{2+}$-32.3 g/1$PO_4^{3-}$-5.7 g/1$NO_3^-$-0.5 g/1$F^-$) at 95° C. for 10 minutes. By the above treatment, a manganese phosphate chemical formation coating layer was formed. There was provided a solid lubricant, the principal components of which were powder of molybdenum disulfide, the average particle diameter of which was 4.0 μm, powder of molybdenum disulfide, the average particle diameter of which was 1.0 μm, and polyamide resin, the average molecular weight of which was 16000, wherein the composition ratio was 1.1 (weight ratio). This solid lubricant was coated on the box 1 and it was subjected to heating and baking treatment at 260° C. for 25 minutes, so that a solid lubricant coating layer was formed. That is, by the treatment of the present invention, a three layer type coating layer composed of an alloy plating layer of Fe—Ni of 3.0 μm thickness, a manganese phosphate chemical formation coating layer of 15 μm thickness and a solid lubricant coating layer of 16 μm thickness was formed in the thread portion 3 and the metallic sealing portion 4 of the box 1 to be evaluated.

In the same manner as that of Example 11, the joint portion was repeatedly made up and broken out for the test. Until the thirteenth test was completed, no galling and seizing occurred in the joint. However, at the fourteenth test, considerable galling and seizing occurred.

Comparative Example 13

Concerning the box 1, the inner diameter of which was 7 inches, made of the tested steel C, an alloy plating layer of Fe-3.5% Ni, the thickness of which was 3.0 μm, was provided in the thread portion 3 and the metallic sealing portion 4 by the same method as that of Example 13. Next, the box 1 was coated with the same solid lubricant as that of Example 14, and the same treatment was carried out. In this way, the solid lubricant coating layer of 16 μm thickness of the comparative example was formed.

Thus obtained joint of the comparative example was repeatedly made up and broken out for the test in the same manner as that of Example 14. As a result, at the seventh test, galling and seizing remarkably occurred, which were caused by the abrasion and local peeling of the solid lubricant coating layer. Therefore, the evaluation test was stopped.

Example 15

A box 1, the inner diameter of which was 7 inches, made of the tested steel A, was degreased in an aqueous degreasing agent. Then the box 1 was subjected to heating nitriding in a bath of molten salt of (15% NaCN-20% KCN-15% NaCNO-10% KCNO-20% $Na_2CO_3$-10% $K_2CO_3$) at 590° C. for 10 minutes. Then it was cooled in an oil bath. The box 1 that had been subjected to the nitriding treatment was degreased in an aqueous degreasing agent and cleaned in an aqueous solution of 5% $H_2SO_4$ at room temperature for 1 second. Then, the box 1 was treated in the bath of manganese phosphate chemical formation of (9.5 g/1$Mn^{2+}$-0.15 g/1$Ni^{2+}$-0.4 g/1$Fe^{2+}$-36 g/1$PO_4^{3-}$-6.1 g/1$NO_3^-$-0.3 g/1$F^-$) at 90° C. for 20 minutes. By the above treatment, a manganese phosphate chemical formation coating layer was formed on the nitriding layer. Next, the box 1 was preliminarily heated at 180° C. for 15 minutes. There was provided a solid lubricant, the principal components of which were powder of molybdenum disulfide, the average particle diameter of which was 4.3 μm, powder of copper, the average particle diameter of which was 1.0 μm, and polyamide resin, the average molecular weight of which was 20000, wherein the composition ratio was 1.0 (weight ratio). This solid lubricant was coated on the box 1. Then it was subjected to heating and baking treatment at 270° C. for 20 minutes, so that a solid lubricant coating layer was formed. That is, by the treatment of the present invention, a three layer type coating layer composed of the nitriding layer of 7.5 μm thickness, the manganese phosphate chemical formation coating layer of 16 μm thickness and the solid lubricant coating layer of 15 μm thickness was formed in the thread portion 3 and the metallic sealing portion 4 of the coupling 1 to be evaluated.

In the same manner as that of Example 11, the joint portion was repeatedly made up and broken out for the test. After the test had been repeated by 15 times, galling and seizing seldom occurred in the sealing portion, that is, good results were achieved.

Comparative Example 14

Concerning a box 1 made of the tested steel A, the inner diameter of which was 7 inches, nitriding layers of 7.5 μm thickness were formed on the thread portion 3 and the metallic sealing portion 4 by the same method as that of Example 15. Next, the surfaces were degreased by an aqueous solution type degreasing agent and washed in water. Then the surfaces were coated with the same solid lubricant as that of Example 15, and the same treatment was conducted. In this way, the solid lubricant coating layer of the comparative example was formed.

The thus obtained joint of the comparative example was repeatedly made up and broken out for the test in the same manner as that of Example 11. As a result, at the eighth repetition test, the solid lubricant coating layer was remarkably worn away and locally peeled off. Therefore, the evaluation test was stopped.

Example 16

A box 1, the inner diameter of which was 7 inches, made of the tested steel B was degreased in a solvent type degreasing agent and cleaned in an aqueous solution of (10% $HNO_3$+1% HF) at room temperature for 60 seconds. Then the box 1 was washed in water. It was dipped in the electroplating bath of (330 g/1$FeSO_4.7H_2O$-12 g/1$CoCl_2.6H_2O$-15 g/1$H_3BO_3$) and electrolysis was conducted for 40 seconds at an electric current density of 20 A/$dm^2$. In this way, the alloy plating layer of Fe-1.2% Co was provided. Next, the box 1 was washed in water and cleaned in the acid of 5% $H_2SO_4$ for 10 seconds and then washed in water.

After that, the box 1 was subjected to a pretreatment conducted in a pretreatment bath of (manganese colloid-sodium pyrophosphate) of the concentration of 0.3 g/l at room temperature for 1 minute. Then, the box 1 was treated in a bath of manganese phosphate chemical formation of (9.5 g/1$Mn^{2+}$-0.15 g/1$Ni^{2+}$-0.9 g/1$Fe^{2+}$-36 g/1$PO_4^{3-}$-6.1 g/1$NO_3^-$-1.0 g/1$F^-$) at 90° C. for 12.5 minutes. By the above treatment, a manganese phosphate chemical formation coating layer was formed. Next, the box 1 was preliminarily heated at 160° C. for 20 minutes. There was provided a solid lubricant, the principal components of which were powder of molybdenum disulfide of which the average particle diameter was 3.5 μm, powder of Cu of which the average particle diameter was 0.8 μm, powder of Zn of which the average particle diameter was 5.0 μm and polyamide resin of which the average molecular weight was 18000, wherein the composition ratio was 1.2 (weight ratio). This solid lubricant was coated on the box 1 and it was subjected to heating treatment at 250° C. for 25 minutes, so that a solid lubricant coating layer was formed.

That is, by the treatment of the present invention, a three layer type coating layer composed of the Fe-1.2% Co alloy layer of 2.0 μm thickness, the manganese phosphate chemical formation coating layer of 10 μm thickness and the solid lubricant coating layer of 21 μm thickness was formed in the thread portion 3 and the metallic sealing portion 4 of the box 1 to be evaluated.

In the same manner as that of Example 11, the joint portion was tested in such a manner that it was repeatedly made up and broken out. After the test had been repeated 15 times, galling and seizing seldom occurred in the sealing portion, that is, very good results were achieved in the test.

Comparative Example 15

A box 1, the inner diameter of which was 7 inches, made of the tested steel B was degreased and cleaned in acid by the same method as that of Example 14. After that, it was dipped in the electroplating bath of (150 g/1$FeSO_4.7H_2O$-100 g/1$CoCl_2.6H_2O$-20 g/1$H_3BO_3$) and electrolysis was conducted for 40 seconds at an electric current density of 20 A/$dm^2$. In this way, the Fe-15% Co alloy plating layer was formed. Next, by the same method as that of Example 16, the manganese phosphate chemical formation coating layer and the solid lubricant coating layer were formed. The comparative example was arranged as described above.

By the treatment described above, on the thread portion 3 and the metallic sealing portion 4 of the joint of the comparative example, there were provided an Fe-15% Co alloy plating layer of 20 μm thickness, a uniform manganese phosphate chemical formation coating layer, and a solid lubricant coating layer of 21 μm thickness composed in the same composition as that of Example 16.

By the same method as that of Example 16, the joint of the comparative example was repeatedly made up and broken out for the test. As a result, at the seventh repetition test, the coating layer was remarkably peeled off. Therefore, the evaluation test was stopped.

Example 17

A box 1, the inner diameter of which was 7 inches, made of steel corresponding to N-80 was degreased in a solvent type degreasing agent and washed in water. Then the box 1 was subjected to the heating nitriding in the bath of (20% NaCN-15% KCN-17% NaCNO-17.5% KCNO-10% $Na_2CO_3$-20% $K_2CO_3$) at 450° C. for 30 minutes. Then it was cooled in an oil bath. The box 1 that had been subjected to the nitriding treatment was degreased in a solvent type degreasing agent and cleaned in an aqueous solution of 5% $H_2SO_4$ at the room temperature for 5 seconds and then washed in water. After that, the box 1 was subjected to the pretreatment conducted in the bath of (titanium colloid-sodium pyrophosphate) of 0.8 g/l at the room temperature for 2 minutes. Then, the box 1 was treated in the bath of manganese phosphate chemical formation of (8.7 g/l$Mn^{2+}$-0.2 g/l$Ni^{2+}$-0.6 g/l$Fe^{2+}$-32.3 g/l$PO_4^{3-}$-5.7 g/l$NO_3^-$-0.6 g/l$F^-$) at 90° C. for 15 minutes. By the above treatment, a manganese phosphate chemical formation coating layer was formed. There was provided a solid lubricant, the principal components of which were powder of molybdenum disulfide, the average particle diameter of which was 2.8 μm, and furan resin, the average molecular weight of which was 185, wherein the composition ratio was 5.0 (weight ratio). This solid lubricant was coated on the box 1. Then it was subjected to heating and baking treatment at 200° C. for 30 minutes, and a solid lubricant coating layer was formed. That is, by the treatment of the present invention, a three layer type coating layer composed of the nitriding layer of 6.4 μm thickness, the manganese phosphate chemical formation coating layer of 14 μm thickness and the solid lubricant coating layer of 14 μm thickness was formed in the thread portion 3 and the metallic sealing portion 4 of the box 1 to be evaluated.

While the sealing portion was given a surface pressure of 6000 kg/cm², the joint portion was repeatedly made up and broken out for the test. Until the fifteenth test was completed, galling and seizing seldom occurred in the sealing portion. However, at the twentieth test, galling and seizing occurred.

Comparative Example 16

Concerning the box 1, the inner diameter of which was 7 inches, made of steel corresponding to N-80, the nitriding layer of 6.4 μm thickness and the manganese phosphate chemical formation coating layer of 14 μm thickness were provided in the thread portion 3 and the metallic sealing portion 4 of the box portion 1 by the same method as that of Example 17. There was provided a solid lubricant, the principal components of which were powder of molybdenum disulfide, the average particle diameter of which was 2.8 μm, and furan resin, the average molecular weight of which was 185, wherein the composition ratio was 0.15 (weight ratio). This solid lubricant was coated on the box 1. Then it was subjected to heating and baking treatment at 200° C. for 30 minutes, so that a solid lubricant coating layer of 14 μm thickness was formed. The comparative example was arranged in the above manner.

In the same manner as that of Example 17, the joint of the comparative example was repeatedly made up and broken out for the test. As a result of the test, it was impossible to provide a sufficiently high lubricating property, and remarkable galling and seizing occurred at the tenth repetition of the test. Therefore, the evaluation test was stopped.

Example 18

A box 1, the inner diameter of which was 7 inches, made of steel corresponding to T-90 was degreased in an aqueous degreasing agent and washed in water. After that, the box 1 was subjected to the pretreatment of blasting with glass beads (diameter: #100, pressure 5 kgf/cm², period; 60 seconds). Then the box 1 was subjected to the heating nitriding in the bath of molten salt of (25% NaCN-10% KCN-25% NaCNO-10% KCNO-20% $Na_2CO_3$-10% $K_2CO_3$) at 570° C. for 20 minutes. Then it was cooled in an oil bath. The box 1 that had been subjected to the nitriding treatment was degreased in an aqueous degreasing agent and cleaned in an aqueous solution of 10% $H_2SO_4$ at room temperature for 10 seconds and then washed in water. After that, the box 1 was subjected to the pretreatment conducted in the bath of (manganese colloid-sodium pyrophosphate) of 0.5 g/l at the room temperature for 20 seconds. Then, the box 1 was treated in the bath of manganese phosphate chemical formation of (8 g/l$Mn^{2+}$-0.3 g/l$Ni^{2+}$-0.2 g/l$Fe^{2+}$-29.5 g/l$PO_4^{3-}$-5.4 g/l$NO_3^-$-0.8 g/l$F^-$) at 85° C. for 13 minutes. Due to the above treatment, a manganese phosphate chemical formation coating layer was formed. There was provided a solid lubricant, the principal components of which were powder of tungsten disulfide, the average particle diameter of which was 3.0 μm, and polyamide resin, the average molecular weight of which was 20000, wherein the composition ratio was 8.0 (weight ratio). This solid lubricant was coated on the box 1 and then it was subjected to heating and baking treatment at 250° C. for 30 minutes, so that a solid lubricant coating layer was formed. That is, by the treatment of the present invention, a three layer type coating layer composed of the nitriding layer of 10 μm thickness, the manganese phosphate chemical formation coating layer of 12 μm thickness and the solid lubricant coating layer of 18.5 μm thickness was formed in the thread portion 3 and the metallic sealing portion 4 of the box 1 to be evaluated.

While the sealing portion 4 was given a surface pressure of 6000 kg/cm², the joint portion was repeatedly made up and broken out for the test. Until the eighteenth test was completed, galling and seizing seldom occurred on the joint. However, at the twentieth test, considerable galling and seizing occurred.

Comparative Example 17

Concerning the box 1, the inner diameter of which was 7 inches, made of steel corresponding to T-90, the nitriding layer of 10 μm thickness and the manganese phosphate chemical formation coating layer of 12 μm thickness were provided in the thread portion 3 and the metallic sealing portion 4 of the box portion 1 by the same method as that of Example 18. There was provided a solid lubricant, the principal components of which were powder of molybdenum disulfide, the average particle diameter of which was 3.0 μm, and polyamide resin, the average molecular weight of which was 20000, wherein the composition ratio was 10 (weight ratio). This solid lubricant was coated on the box 1.

Then it was subjected to heating and baking treatment at 200° C. for 30 minutes, so that a solid lubricant coating layer of 18.5 μm thickness was formed. The comparative example was arranged in the above manner.

In the same manner as that of Example 18, the joint of the comparative example was repeatedly made up and broken out for the test. As a result of the test, the solid lubricant coating layer was remarkably peeled off. Therefore, the evaluation test was stopped at the ninth repetition test.

INDUSTRIAL APPLICABILITY

As described above, on the contact surface of the box or pin of the threaded joint of the present invention, there is provided a phosphate chemical formation coating layer, or alternatively there are provided a nitriding layer and a phosphate chemical formation coating layer, and a resin coating layer is formed on this phosphate chemical formation coating layer. When the thickness of this resin coating layer is made to be larger than the thickness or surface roughness of the phosphate chemical formation coating layer and, in addition, when the thickness of this resin coating is made to be larger than the surface roughness of the opposing sliding surface, it is not necessary to use a liquid lubricant such as compound grease which is usually coated before making up a joint of the prior art. Even when the joint of the invention is repeatedly fastened and unfastened, no galling occurs and the sealing property can be maintained high. According to the present invention, it is possible to provide high-performance threaded joint.

We claim:

1. A threaded joint having high galling resistance comprising: a pin composed of an external thread and a metal contact portion having no thread; and a box composed of an internal thread and a metal contact portion having no thread, wherein a phosphate chemical formation coating layer is provided on a contact surface of at least one of the box and the pin, a resin coating layer, in which at least one powder selected from the group consisting of molybdenum disulfide and tungsten disulfide is dispersed and mixed, is formed on the phosphate chemical formation coating layer, and the thickness of the resin layer is larger than the thickness of the phosphate chemical formation coating layer.

2. A threaded joint having high galling resistance according to claim 1, wherein the thickness of the resin coating is larger than the surface roughness of the phosphate chemical formation coating layer.

3. A threaded joint having high galling resistance according to claim 1, wherein the surface roughness of sliding surfaces opposed to each other is smaller than the thickness of the resin coating layer.

4. A threaded joint having high galling resistance according to claim 1, wherein the thickness of the phosphate chemical formation coating layer is 5 to 30 μm, and wherein said at least one powder selected from the group consisting of molybdenum disulfide and tungsten disulfide is present in a range determined by the following expression, 0.2≦(quantity of powder selected from the group consisting of molybdenum disulfide and tungsten disulfide)/(quantity of resin)≦9.0 (weight ratio), and the thickness of the resin coating layer is 10 to 45 μm.

5. A threaded joint having high galling resistance according to claim 1, wherein a corrosion inhibitor is dispersed and mixed in the resin.

6. A method of conducting surface treatment on a joint of a steel pipe comprising the steps of: providing a manganese phosphate chemical formation coating layer of 5 to 30 μm thickness on at least one of a threaded portion and a metallic sealing portion of the joint of the steel pipe; and coating thereon a solid lubricant containing at least one powder selected from the group consisting of molybdenum disulfide and tungsten disulfide and also containing at least one of epoxy resin, furan resin and polyamideimide resin, the composition of which satisfies the following expression, 0.2≦(quantity of said at least one powder selected from the group consisting of molybdenum disulfide and tungsten disulfide)/(quantity of said at least one of epoxy resin, furan resin and polyamideimide resin) ≦9.0 (weight ratio);

and conducting heat treatment on the thus provided layer so as to form a solid lubricant coating layer of 10 to 45 μm thickness.

7. A method of conducting surface treatment on a joint of a steel pipe according to claim 6, further comprising the step of coating a solid lubricant containing at least one powder selected from the group consisting of Cu and Zn, the quantity of which is 10 to 50 weight % with respect to the quantity of at least one powder selected from the group consisting of molybdenum disulfide and tungsten disulfide, wherein the composition satisfies the following expression, 0.2≦(quantity of at least one powder selected from the group consisting of molybdenum disulfide and tungsten disulfide and quantity of at least one powder selected from the group consisting of Cu and Zn)/(quantity of at least one of epoxy resin, furan resin and polyamideimide resin)≦9.0 (weight ratio).

8. A method of conducting surface treatment on a joint of a steel pipe according to claim 6, wherein a particle diameter of said at least one powder selected from the group consisting of molybdenum disulfide and tungsten disulfide, which is an essential component of solid lubricant to compose a solid lubricant coating layer, is in a range from 0.45 to 10 μm when it is measured by Fisher's Measuring Method, and the solid lubricant is composed of one of epoxy resin of which the molecular weight is in a range from 2000 to 10000, furan resin of which the molecular weight is in a range from 150 to 250, and polyamideimide resin of which the molecular weight is in a range from 10000 to 25000.

9. A method of conducting surface treatment on a joint of a steel pipe according to claim 7, wherein said powder selected from the group consisting of Cu and Zn has a particle diameter in a range from 0.5 to 10 μm.

10. A method of conducting surface treatment on a joint of a steel pipe for providing a three layer type coating layer comprising the steps of: providing a nitriding layer, the thickness of which is 1 to 20 μm, on at least one of a thread portion and a metal seal portion of the joint of an oil well steel pipe made of alloy steel, said oil well steel pipe being formed from an alloy steel having a Cr content which is not less than 10 weight %; providing a surface treatment layer having a thickness of 0.5 to 15 μm selected from one of an iron plating layer and an iron alloy plating layer containing not more that 10% by weight of at least one element selected from the group consisting of Ni and Co, and also providing a manganese phosphate chemical formation coating layer, the thickness of which is 5 to 30 μm; and coating thereon a solid lubricant containing at least one powder selected from the group consisting of molybdenum disulfide and tungsten disulfide and also containing at least one of epoxy resin, furan resin and polyamideimide resin, the composition of which satisfies the following expression, 0.2≦(quantity of at least one powder selected from the group consisting of molybdenum disulfide and tungsten disulfide)/(quantity of at least one of epoxy resin, furan resin and polyamideimide resin)≦9.0 (weight ratio);

and conducting heat treatment to form a solid lubricant coating layer of 10 to 45 µm thickness.

11. A method of conducting surface treatment on a joint of a steel pipe according to claim 10, wherein said solid lubricant contains at least one powder selected from the group consisting of Cu and Zn, the quantity of which is 10 to 50% based on weight with respect to a quantity based on weight of said at least one powder selected from the group consisting of molybdenum disulfide and tungsten disulfide.

12. A method of conducting surface treatment on a joint of a steel pipe according to claim 11, wherein a particle diameter of said at least one powder selected from the group consisting of molybdenum disulfide and tungsten disulfide, which is an essential component of solid lubricant to compose a solid lubricant coating layer, is in a range from 0.45 to 10 µm when it is measured by Fisher's Measuring Method, a particle diameter of said at least one powder selected from the group consisting of Cu and Zn is in a range from 0.5 to 10 µm, and the solid lubricant is composed of one of epoxy resin of which the molecular weight is in a range from 2000 to 10000, furan resin of which the molecular weight is in a range from 150 to 250, and polyamideimide resin of which the molecular weight is in a range from 10000 to 25000.

13. A method of conducting surface treatment on a joint of steel pipe according to claim 10, wherein a particle diameter of said at least one powder selected from the group consisting of molybdenum disulfide and tungsten disulfide, which is an essential component of solid lubricant to compose a solid lubricant coating layer, is in a range from 0.45 to 10 µm when it is measured by Fisher's Measuring Method, and the solid lubricant is composed of one of epoxy resin of which the molecular weight is in a range from 2000 to 10000, furan resin of which the molecular weight is in a range from 150 to 250, and polyamideimide resin of which the molecular weight is in a range from 10000 to 25000.

14. A threaded joint having high galling resistance comprising: a pin composed of an external thread and a metal contact portion having no thread; and a box composed of an internal thread and a metal contact portion having no thread, wherein a nitriding layer and a phosphate chemical formation coating layer disposed thereon are provided on a contact surface of at least one of the box and the pin; a resin coating layer, in which at least one powder selected from the group consisting of molybdenum disulfide and tungsten disulfide is dispersed and mixed, is formed on the phosphate chemical formation coating layer, and the thickness of the resin layer is larger than the thickness of the phosphate chemical formation coating layer.

15. A threaded joint having high galling resistance according to claim 14 wherein the nitriding layer has a thickness of 1 to 20 µm.

16. A method of conducting surface treatment on a joint of a steel pipe comprising the steps of: providing a nitriding layer of 1 to 20 µm thickness in combination with a manganese phosphate chemical formation coating layer of 5 to 30 µm thickness on at least one of a threaded portion and a metallic sealing portion of the joint of the steel pipe; and coating thereon a solid lubricant containing at least one powder selected from the group consisting of molybdenum disulfide and tungsten disulfide and also containing at least one of epoxy resin, furan resin and polyamideimide resin, the composition of which satisfies the following expression, 0.2≦(quantity of said at least one powder selected from the group consisting of molybdenum disulfide and tungsten disulfide)/(quantity of said at least one of epoxy resin, furan resin and polyamideimide resin) ≦9.0 (weight ratio);

and conducting heat treatment on the thus provided layer so as to form a solid lubricant coating layer of 10 to 45 µm thickness.

* * * * *